(12) United States Patent
Cabrera et al.

(10) Patent No.: US 10,021,472 B2
(45) Date of Patent: Jul. 10, 2018

(54) DOME FOR A PERSONAL AUDIO DEVICE

(71) Applicant: Sonion Nederland B.V., Hoofddorp (NL)

(72) Inventors: Andrés Alberto Alvarez Cabrera, Hoofddorp (NL); Peter Rietman, Hoofddorp (NL); Nishant Lawand, Hoofddorp (NL); Theodorus Geradus Maria Brouwer, Hoofddorp (NL); Konrad van den Berg, Hoofddorp (NL); Andreas Tiefenau, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 0 days.

(21) Appl. No.: 15/484,330

(22) Filed: Apr. 11, 2017

(65) Prior Publication Data

US 2017/0303029 A1 Oct. 19, 2017

(30) Foreign Application Priority Data

Apr. 13, 2016 (EP) .................................... 16165163

(51) Int. Cl.
*H04R 25/00* (2006.01)
*H04R 1/10* (2006.01)
(Continued)

(52) U.S. Cl.
CPC ........... *H04R 1/1016* (2013.01); *H04R 5/033* (2013.01); *H04R 25/604* (2013.01);
(Continued)

(58) Field of Classification Search
CPC .... H04R 1/1016; H04R 5/033; H04R 25/604; H04R 25/654; H04R 25/658; H04R 2201/10; H04B 7/00
See application file for complete search history.

(56) References Cited

U.S. PATENT DOCUMENTS 6,788,796 B1 9/2004 Miles et al.
6,831,577 B1 12/2004 Furst
(Continued)

FOREIGN PATENT DOCUMENTS

DE 102014200605 A1 4/2015
WO WO 00/00088 A1 1/2000
(Continued)

OTHER PUBLICATIONS

Extended European Search Report for Application No. 17166042.6, dated Aug. 18, 2017 (2 pages).
(Continued)

*Primary Examiner* — Brian Ensey
(74) *Attorney, Agent, or Firm* — Nixon Peabody LLP

(57) ABSTRACT

A dome for a personal audio device. The dome forms a first flexible circumferential member and comprising a guiding structure extending in a longitudinal direction and forming an interface for guiding sound from or to the personal audio device. The guiding structure comprises a least one sound opening configured for passage of sound from or to the personal audio device in a direction transverse to the longitudinal direction of the guiding structure. The first flexible member is configured to at least partly close the sound opening during insertion of the dome into an ear canal of a user.

15 Claims, 25 Drawing Sheets

(51) Int. Cl.
*H04R 5/033* (2006.01)
*H04B 7/00* (2006.01)

(52) U.S. Cl.
CPC ............ *H04R 25/658* (2013.01); *H04B 7/00* (2013.01); *H04R 2201/10* (2013.01)

(56) References Cited

U.S. PATENT DOCUMENTS

| | | | |
|---|---|---|---|
| 6,853,290 B2 | 2/2005 | Jorgensen et al. | |
| 6,859,542 B2 | 2/2005 | Johannsen et al. | |
| 6,888,408 B2 | 5/2005 | Furst et al. | |
| 6,914,992 B1 | 7/2005 | van Halteren et al. | |
| 6,919,519 B2 | 7/2005 | Ravnkilde et al. | |
| 6,930,259 B1 | 8/2005 | Jorgensen et al. | |
| 6,943,308 B2 | 9/2005 | Ravnkilde et al. | |
| 6,974,921 B2 | 12/2005 | Jorgensen et al. | |
| 7,008,271 B2 | 3/2006 | Jorgensen | |
| 7,012,200 B2 | 3/2006 | Moller | |
| 7,062,058 B2 | 6/2006 | Steeman et al. | |
| 7,062,063 B2 | 6/2006 | Hansen et al. | |
| 7,072,482 B2 | 7/2006 | Van Doorn et al. | |
| 7,088,839 B2 | 8/2006 | Geschiere et al. | |
| 7,110,560 B2 | 9/2006 | Stenberg | |
| 7,136,496 B2 | 11/2006 | van Halteren et al. | |
| 7,142,682 B2 | 11/2006 | Mullenborn et al. | |
| 7,181,035 B2 | 2/2007 | van Halteren et al. | |
| 7,190,803 B2 | 3/2007 | van Halteren | |
| 7,206,428 B2 | 4/2007 | Geschiere et al. | |
| 7,221,767 B2 | 5/2007 | Mullenborn et al. | |
| 7,221,769 B1 | 5/2007 | Jorgensen | |
| 7,227,968 B2 | 6/2007 | van Heltren et al. | |
| 7,239,714 B2 | 7/2007 | de Blok et al. | |
| 7,245,734 B2 | 7/2007 | Niederdraenk | |
| 7,254,248 B2 | 8/2007 | Johannsen et al. | |
| 7,286,680 B2 | 10/2007 | Steeman et al. | |
| 7,292,700 B1 | 11/2007 | Engbert et al. | |
| 7,292,876 B2 | 11/2007 | Bosh et al. | |
| 7,336,794 B2 | 2/2008 | Furst et al. | |
| 7,376,240 B2 | 5/2008 | Hansen et al. | |
| 7,403,630 B2 | 7/2008 | Jorgensen et al. | |
| 7,415,121 B2 | 8/2008 | Mögelin et al. | |
| 7,425,196 B2 | 9/2008 | Jorgensen et al. | |
| 7,460,681 B2 | 12/2008 | Geschiere et al. | |
| 7,466,835 B2 | 12/2008 | Stenberg et al. | |
| 7,492,919 B2 | 2/2009 | Engbert et al. | |
| 7,548,626 B2 | 6/2009 | Stenberg et al. | |
| 7,657,048 B2 | 2/2010 | van Halteren et al. | |
| 7,684,575 B2 | 3/2010 | van Halteren et al. | |
| 7,706,561 B2 | 4/2010 | Wilmink et al. | |
| 7,715,583 B2 | 5/2010 | Van Halteren et al. | |
| 7,728,237 B2 | 6/2010 | Pedersen et al. | |
| 7,809,151 B2 | 10/2010 | Van Halteren et al. | |
| 7,822,218 B2 | 10/2010 | Van Halteren | |
| 7,899,203 B2 | 3/2011 | Van Halteren et al. | |
| 7,912,240 B2 | 3/2011 | Madaffari et al. | |
| 7,946,890 B1 | 5/2011 | Bondo et al. | |
| 7,953,241 B2 | 5/2011 | Jorgensen et al. | |
| 7,961,899 B2 | 6/2011 | Van Halteren et al. | |
| 7,970,161 B2 | 6/2011 | van Halteren | |
| 8,098,854 B2 | 1/2012 | van Halteren et al. | |
| 8,101,876 B2 | 1/2012 | Andreasen et al. | |
| 8,103,039 B2 | 1/2012 | van Halteren et al. | |
| 8,160,290 B2 | 4/2012 | Jorgensen et al. | |
| 8,170,249 B2 | 5/2012 | Halteren | |
| 8,189,804 B2 | 5/2012 | Hruza | |
| 8,189,820 B2 | 5/2012 | Wang | |
| 8,223,996 B2 | 7/2012 | Beekman et al. | |
| 8,233,652 B2 | 7/2012 | Jorgensen et al. | |
| 8,259,963 B2 | 9/2012 | Stenberg et al. | |
| 8,259,976 B2 | 9/2012 | van Halteren | |
| 8,259,977 B2 | 9/2012 | Jorgensen et al. | |
| 8,280,082 B2 | 10/2012 | van Halteren et al. | |
| 8,284,966 B2 | 10/2012 | Wilk et al. | |
| 8,313,336 B2 | 11/2012 | Bondo et al. | |
| 8,315,422 B2 | 11/2012 | van Halteren et al. | |
| 8,331,595 B2 | 12/2012 | van Halteren | |
| 8,369,552 B2 | 2/2013 | Engbert et al. | |
| 8,369,554 B2* | 2/2013 | Oberlander | H04R 25/652 381/322 |
| 8,379,899 B2 | 2/2013 | van Halteren et al. | |
| 8,509,468 B2 | 8/2013 | van Halteren et al. | |
| 8,526,651 B2 | 9/2013 | Lafort et al. | |
| 8,526,652 B2 | 9/2013 | Ambrose et al. | |
| 9,277,336 B2* | 3/2016 | Moller | H04R 25/652 |
| 2005/0238192 A1* | 10/2005 | Ford | H04R 25/654 381/322 |
| 2010/0086158 A1 | 4/2010 | Oberlander | |
| 2010/0166241 A1* | 7/2010 | Sabio | H04R 25/656 381/328 |
| 2010/0322452 A1 | 12/2010 | Ladabaum et al. | |
| 2011/0182453 A1 | 7/2011 | van Hal et al. | |
| 2011/0189880 A1 | 8/2011 | Bondo et al. | |
| 2011/0299708 A1 | 12/2011 | Bondo et al. | |
| 2011/0299712 A1 | 12/2011 | Bondo et al. | |
| 2011/0311069 A1 | 12/2011 | Ambrose et al. | |
| 2012/0014548 A1 | 1/2012 | van Halteren | |
| 2012/0027245 A1 | 2/2012 | van Halteren et al. | |
| 2012/0140966 A1 | 6/2012 | Mocking et al. | |
| 2012/0155683 A1 | 6/2012 | van Halteren | |
| 2012/0155694 A1 | 6/2012 | Reeuwijk et al. | |
| 2012/0255805 A1 | 10/2012 | van Halteren et al. | |
| 2013/0028451 A1 | 1/2013 | de Roo | |
| 2013/0136284 A1 | 5/2013 | van Hal et al. | |
| 2013/0142370 A1 | 6/2013 | Engbert et al. | |
| 2013/0163799 A1 | 6/2013 | Van Halteren | |
| 2013/0195295 A1 | 8/2013 | van Halteren et al. | |

FOREIGN PATENT DOCUMENTS

| | | |
|---|---|---|
| WO | WO 2006/094502 A1 | 9/2006 |
| WO | WO 2009/056167 A1 | 5/2009 |
| WO | WO 2012/121730 A1 | 9/2012 |

OTHER PUBLICATIONS

European Search Report corresponding to European Patent Application No. 16165163.3, European Patent Office, dated Aug. 3, 2016; (3 pages).

* cited by examiner

DOME FOR A PERSONAL AUDIO DEVICE

CROSS-REFERENCE TO RELATED APPLICATIONS

This application claims the benefit of European Patent Application Serial No. 16165163.3, filed Apr. 13, 2016, which is incorporated herein by reference in its entirety.

FIELD OF THE INVENTION

The present invention relates to a dome for a personal audio device. The dome is for positioning in or partly in the ear canal of a user. The dome comprises a flexible circumferential member configured to at least partly close the sound opening during insertion of the dome and a guiding structure forming an interface for guiding sound from the personal audio device.

BACKGROUND OF THE INVENTION

Debris, such as cerumen and moisture can accumulate on personal audio devices causing a variety of problems, such as clogging sound openings and corroding parts. Parts and features of the personal audio device need to be protected from such debris to prevent any adverse effects.

Traditionally, barriers are used to protect the personal audio device from debris ingress through sound ports. A problem with these barriers is that they eventually soil, which affects the acoustic transmission. The existing solutions require cleaning or replacement of the barrier, but this process tends to be too complicated either because of size or tool requirements. Improper servicing can aggravate the situation taking contaminants to locations where they damage other parts of the personal audio device, which parts may be even more difficult to service.

SUMMARY OF INVENTION

It is an object of embodiments of the invention to provide a dome for a personal audio device.

It is a further object of embodiments of the invention to provide a dome which improves wax protection of a personal audio device.

It is an even further object of embodiments of the invention to provide a dome which can modify an acoustic response of a personal audio device.

According to a first aspect, the invention provides a dome for a personal audio device, the dome forming a first flexible circumferential member and comprising a guiding structure extending in a longitudinal direction and forming an interface for guiding sound from or to the personal audio device, wherein the guiding structure comprises a least one sound opening configured for passage of sound from or to the personal audio device in a direction transverse to the longitudinal direction of the guiding structure, and wherein the first flexible circumferential member is configured to at least partly close the sound opening during insertion of the dome into an ear canal of a user.

It should be understood that in the context of the present invention, the term "personal audio device" may be a hearing aid. However, the personal audio device may also comprise hearables, such as consumer accessories, etc.

It should further be understood that sound may be guided from or to the personal audio device or from and to the personal audio device. Thus, the personal audio device may comprise a receiver to generate sound which may be guided out of the sound opening. Alternatively or additionally, the personal audio device may comprise a microphone which may receive sound being guided into the sound opening.

The first flexible member and the guiding structure may be formed as in one piece, e.g. by moulding or another suitable manufacturing process. However, in an alternative embodiment, the flexible member and the guiding structure may be formed as two separate components which may subsequently be attached to each other or to the personal audio device. The flexible member may be detachably attached to the guiding structure to allow the two elements to be separated again, e.g. for replacement of one of the elements. Alternatively, the flexible member may be permanently attached to the guiding structure, whereby the two elements cannot be separated without destroying at least one of the elements.

The guiding structure forms an interface for guiding sound from or to the personal audio device so that the personal audio device can output sound in the guiding structure and/or so that the personal audio device can receive sound. The interface may further be configured to receive a part of the personal audio device. In the context of the present invention, the term "an interface for receiving a part of the personal audio device" should be understood as an interface enabling engagement between the guiding structure and a personal audio device. In one embodiment, this may e.g. be achieved by inserting a part of the personal audio device into the guiding structure, whereas it an alternative embodiment may be achieved by inserting the guiding structure into a part of the personal audio device.

It should be understood that the guiding structure may have sufficient strength to act as a mechanical supporting structure for the dome. However, the dome may in alternative embodiment comprise a separate supporting structure acting as a mechanical support for the dome. In the latter embodiment, the guiding structure and the first flexible member may be attached to the supporting structure to form the dome.

In the context of the present invention, the term "longitudinal direction" should be understood at a direction in which the guiding structure is longest. To facilitate insertion of the dome into an ear canal, the longitudinal direction may substantially equal the insert direction of the dome/personal audio device into the ear canal.

In the context of the present invention, the term "axial direction" should be understood at a direction substantial parallel to the ear canal, whereby the axial direction equals the insert direction of the dome/the personal audio device into the ear canal.

Thus, the longitudinal direction, the axial direction, and the insert direction may be substantially the same direction.

It should be understood, that the personal audio device may be located outside the ear canal when the dome is inserted into the ear canal, as the part of the personal audio device received in the interface of the guiding structure may be a tube attached to a personal audio device outside the ear canal.

The interface may thus the configured to receive a tube end, a nozzle, or other part of the personal audio device, or alternatively, the personal audio device itself may be received in the interface. It should be understood that the tube end, the nozzle, the personal audio device or a part hereof may be received directly in the interface, or alternatively may be connected to/attached to the interface of the guiding structure via a separate element, such as a connector.

When the part of the personal audio device is received in the interface, the personal audio device can output sound in the guiding structure.

In one embodiment, the interface may be configured for receiving a part of the personal audio device. The personal audio device may be received in the axial direction. It should however be understood, that the part of the personal audio device may also be received in a direction transverse to the axial direction.

In order to allow sound to propagate into the ear canal of a user, the guiding structure comprises a least one sound opening configured for passage of sound received in the guiding structure from the personal audio device in a direction transverse to the longitudinal direction out of the guiding structure. Thus, the sound opening may be a sound outlet.

When arranging the sound opening so that the passage of sound is in a direction transverse to the longitudinal direction, the ingress of debris, wax, etc. can be minimised as the transport way for debris entering the personal audio device is not a straight transport way but changes direction due to the deviation of the transport way. Furthermore, it may be less likely that the sound opening contact the debris, cerumen, wax, etc. directly compared to traditional sound openings being arranged at the tip end (i.e. front end relative to the insertion direction) even if the sound opening is arranged at a front part of the guiding structure.

In the context of the present invention, it should be understood that the term "debris" covers cerumen, wax, contaminants, or other unwanted material.

It should be understood that transverse to the longitudinal direction is any direction not parallel to the longitudinal direction; i.e. a direction being perpendicular to the longitudinal direction or a direction at an angle in the range of 5-185 degrees relative to the longitudinal direction.

The first flexible circumferential member is configured to at least partly close the sound opening during insertion of the dome into an ear canal of a user. This may be achieved by forming the first flexible circumferential member of a flexible material whereby movement of the dome into the ear canal may cause the first flexible circumferential member to be press against the opening to at least partly close the sound opening during insertion.

In an alternative embodiment, the first flexible circumferential member may be formed as a flexible neck-portion arranged around the guiding structure whereby the neck-portion may partly cover the sound opening to limit the risk of debris, wax, etc. entering the opening and thereby being configured to at least partly close the sound opening during insertion of the dome from the ear canal.

The inventors of the present invention have performed wax protection performance test of domes according to the present invention. The performance tests are carried out as a "dip test" where domes are dipped into an artificial cerumen several times. One of the parameters analysed is the number of dips before the sound opening is clogged. The dip test reveals that the sound opening of a traditional dome gets clogged after 1-2 dips, whereas the sound opening of domes according to the present invention remains unclogged after 10 times more dips into the artificial cerumen.

In an alternative embodiment, the invention provides a dome for a personal audio device, the dome forming a first flexible circumferential member configured and comprising a guiding structure forming an interface for guiding sound from or to the personal audio device, wherein the guiding structure comprises a least one sound opening configured for passage of sound from or to the personal audio device out of or into the guiding structure in a direction transverse to an insert direction of the dome.

It should be understood, that the insert direction is a direction substantially parallel to the ear canal, whereby the insert direction equals the longitudinal direction.

To decrease the risk of accumulation of debris, wax, etc., at the edge of the at least one sound opening/sound outlet, a circumferential edge along the at least one opening may be formed at an angle in the range of 15-75 degrees, such as in the range of 25-65 degrees, relative to an outer surface of the guiding structure, as debris, wax, and the like may better adhere to edges of an opening being perpendicular to the outer surface. Additionally or alternatively, the edges of the openings may be rounded; e.g. by adding a fillet of radii in the range of 0.1 and 1.0 mm.

To decrease the risk of debris blocking or clogging the sound openings it may be an advantage that the length L of the openings is relatively short compared to the diameter d of the openings. In the context of the present invention, the term "length of the opening" should be understood as length of the edge surrounding the opening; i.e. the material thickness of the element in which the opening is arranged. An improved resistance to clogging may be achieved by having a length L being less than 1.0 mm, such as less than 0.8 mm such as less than 0.6 mm.

To facilitate protection of the at least one sound opening during insertion of the dome, the first flexible circumferential member may form a tip end terminating the dome in the longitudinal direction, as the first flexible circumferential member thereby may be at the front part of the dome during insertion hereof.

The dome may in one embodiment further comprise a second flexible circumferential member. At least one of the first and second flexible circumferential members may be configured for supporting the dome against an inner wall of an ear canal of a user.

Since the first and/or second flexible circumferential member may be configured for supporting the dome against an inner wall of an ear canal of a user, it may also ensure that the at least one opening being transverse to the longitudinal direction is not in contact with the ear canal when inserted into the ear canal.

In the context of the present invention, the term "circumferential member" covers an element extending from the guiding structure outwardly towards the ear canal when the dome is inserted into the ear canal. The circumferential member may be of any shape and may have a size sufficiently large to support the dome against the inner wall of the ear canal. By "flexible" should be understood that the circumferential member can contact or seal the ear canal with improved comfort when supporting the dome against the inner wall.

The sound opening may be at least partly covered by a flexible flap configured to at least partly close the opening during insertion and/or removal of the dome from the ear canal. The flexible flap may be attached to an outer surface of the guiding structure at one side of the opening. When the flexible flap is attached at the side being closest to the outside of the ear canal, the flap may be configured to close the opening during removal, as movement of the guiding structure out of the ear canal may cause the flexible flap to be press against the opening to at least partly close the opening to limit the risk of debris, wax, etc. to be pressed into the guiding structure via the opening during removal. When the flexible flap is attached at the side being closest to the inside of the ear canal, the flap may be configured to at least partly close the opening during insertion, as movement of the guiding structure into the ear canal may cause the flexible flap to be press against the opening to at least partly close the opening during insertion.

In an alternative embodiment, the flexible flap configured to at least partly close the opening of the sound opening during insertion and/or removal of the dome from the ear canal may be formed as a flexible neck-portion arranged around and along the circumferential edge of the opening. The neck-portion may partly cover the sound opening to limit the risk of debris, wax, etc. entering the opening.

The flexible flap may thus be configured to prevent contact between the opening and the ear canal and may deviate cerumen from the opening during movement of the dome in the ear canal. This may be achieved by the flexible flap being configured to move between a first configuration, where the sound opening is open, and a second configuration, where the sound opening is at least partly closed.

The first and/or second flexible circumferential member may have a curved shape, such as a concave shape to increase comfort of a user, as this shape may increase the flexibility of the flexible member during insertion of the dome into an ear canal. Furthermore, a curved shape of the first and/or second flexible member if configured to support the dome against an inner wall of an ear canal may assist a user during insertion, as the curved part may facilitate alignment with the ear canal and thus facilitate insertion.

Additionally, a curved shape of the first and/or second flexible circumferential member may increase the area covered by the first and/or second flexible member compared to the area covered by traditional wax barriers and thereby improve the possibility of deviating wax without increasing the outer diameter of the first and/or second flexible circumferential member.

To further decrease the risk of wax entering the at least one sound opening, the dome may further comprise a deviation member arranged adjacent to the first flexible circumferential member in the longitudinal direction. The deviation member may be configured to at least partly close the sound opening, whereby the ingress of debris, wax, etc. can be minimised as the transport way for debris entering the personal audio device is not a straight transport way but changes direction since the deviation member may deviate the transport way.

In one embodiment, the deviation member may be arranged between the first flexible circumferential member and the second flexible circumferential member.

The deviation member may comprise a substantially circular rim portion extending around the guiding structure. If the dome comprises more than one sound opening, such a deviation member may at least partly close a plurality of sound openings.

To limit the risk of ingress of debris, a porous element, such as a foam having an open cell structure, a wire mesh, or another porous element, may at least partly fill the sound opening. The porous element allows sound to propagate out of and/or into the sound opening, but limits the risk of ingress of debris into the guiding structure via the sound opening.

In one embodiment, the porous element may be arranged at least partly in the guiding structure. The porous element may be chosen so that is allows sound to propagate out of and/or into the sound opening, while at the same time limits the risk of ingress of debris.

To facilitate engagement between the dome and a part of a personal audio device, the guiding structure may be elongated and may extend in the longitudinal direction. Thus, the personal audio device may be inserted in a straight movement from one end of the guiding structure.

The guiding structure may form an inner space confined by the guiding structure and the part of the personal audio device. Consequently, the personal audio device can output sound in this inner space, when the personal audio device is received in the guiding structure. It should be understood, that the dome may alternatively be received in the personal audio device which may likewise form an inner space confined by the guiding structure and the part of the personal audio device. Alternatively or additionally, the personal audio device may receive sound in the inner space.

Thus, the guiding structure may form an inner cavity in which at least a part of the personal audio device may be received. As the inner cavity may not be filled completely when the personal audio device is inserted at least partly into the guiding structure, an inner space may be formed inside the guiding structure, which inner space by the confined by an inner wall of the guiding structure and a part of the personal audio device.

Consequently, the personal audio device may output sound in the inner space and/or may receive sounds in the inner space, and the sound opening may be arranged in the part of the guiding structure confining the inner cavity to allow sound to propagate out of the inner space and/or into the inner space.

In one embodiment, a second flexible circumferential member may be arranged at a distance from the first member to form a second space between the first and second members. The second space may be arranged in communication with the guiding structure via the sound opening. Thus, sound may propagate form or to the guiding structure via the sound opening to or from the second space between the first and second flexible members.

The second flexible circumferential member and the guiding structure may be formed as in one piece or alternatively be formed as two separate components which may subsequently be attached to each other. The second flexible circumferential member may be detachable attached to the guiding structure to allow the two elements to be separated again, e.g. for replacement. Alternatively, the second flexible circumferential member may be permanently attached to the guiding structure.

To facilitate sound propagation from the personal audio device to the user, at least one of the first and second flexible circumferential members may comprise at least one opening configured for sound passage.

In one embodiment, the flexible circumferential member being arranged deepest in the ear canal may be the flexible circumferential member comprising the at least one opening configured for sound passage. Thus, the first flexible member may comprise at least one opening configured for sound passage when the first flexible member is the front flexible member, and the second flexible member may comprise at least one opening configured for sound passage when the second flexible member is the front flexible member, where front should be understood as the member being deepest in the ear when the dome is inserted into an ear canal.

Thus, the front flexible member (deepest in the ear) may act as wax protection system by increasing the complexity of the transport way of debris entering the guiding structure, since debris will first have to pass the at least one opening and subsequently the sound opening of the guiding structure. Furthermore, the second space between the first and second flexible members (i.e. a front and a rearward) may be used to prevent contact of the sound opening with the ear canal wall, since the first and second member both are arranged circumferential to the guiding structure. Additionally, the second space may hamper debris, wax etc. to pass from the first flexible member and the sound opening to the guiding structure.

In embodiments where the first flexible circumferential member forms a tip end terminating the dome, the first flexible circumferential member may be the front flexible member.

In one embodiment, both the first and second flexible member may be configured for supporting the dome against the inner wall. It should however be understood, that in one embodiment only the first or second flexible circumferential member supports the dome against the inner wall of the ear canal.

Thus, the second space may in one embodiment be confined by an inner wall of the ear canal and the first flexible circumferential member and the second flexible circumferential member. In an alternative embodiment, the second space may be confined by the first flexible circumferential member and the second flexible circumferential member which are joined along an outer edge. In the latter embodiment, the first and second flexible circumferential members form a balloon-like member within which the second space is defined. It should be understood, that the guiding structure in both alternatives may form part of the boundary of the second space, whereby the second space may be confined by an inner wall of the ear canal, the first flexible circumferential member, the second flexible circumferential member, and the guiding structure. Alternatively, the second space may be confined by the first and second flexible circumferential members being joined along an outer edge and the guiding structure.

The second space may lead to improved acoustical effects, such as the resonance of the front volume to increase bandwidth. An additional acoustic resonance can be tuned to appear at a chosen frequency, e.g. a frequency in the range of 2-10 kHz.

The second space is not pressurized and it is maintained via the structural integrity of the first and second flexible circumferential members. The volume of the second space may be at least 10 mm3, such as in the range of 10-2000 mm3.

The at least one opening in the first and/or second flexible circumferential member may in one embodiment be arranged at a distance from a centre point of the flexible member; i.e. from a centre axis of the dome in the longitudinal direction. In cases where the flexible circumferential member comprises two or more openings, two of the openings or all openings may be symmetrically arranged relative to the centre axis of the dome. When off-setting the at least one opening, it may be possible to increase the complexity of the transport way for debris even further.

To improve comfort for a user, a flexibility of at least one of the first flexible circumferential member and the second flexible circumferential member may be larger towards the edge of the flexible member that at the centre of the flexible circumferential member. Consequently, the flexible circumferential member may have a highly compliant outer edge which may form a seal against the inner wall of the ear canal without decreasing comfort for the user.

In an alternative embodiment, improved comfort may be achieved by providing at least one of the first flexible circumferential member and the second flexible circumferential member with a flexible portion in an area adjacent to the guiding structure as this may allow the remaining part of the flexible member to bent along this flexible portion which may act as a hinge-like structure.

By providing at least one of the first and second flexible circumferential members with a higher flexibility at the outer edge it may further be possible to prevent scraping or pushing cerumen or other contaminants already attached to the inner wall of the ear canal by the dome.

Additionally or alternatively, a thickness of at least one of the first member and the second flexible circumferential member may be larger towards the centre of the member than at the edge of the member. This may also improve comfort for a user, as this may also facilitate sealing against the inner wall without decreasing comfort.

As described above, at least one of the first flexible circumferential member and the second flexible circumferential member may be detachable attached to the dome to form a detachable member and thereby facilitate replacement of the at least one flexible circumferential member. It may thus be possible to reuse the dome after replacement of a broken or used flexible circumferential member.

The detachable member may be attached by frictional forces, e.g. by providing the flexible member with an attachment part slightly larger than the attachment position in which the attachment part is to be inserted. Or oppositely, by providing the flexible member with an attachment part being slightly smaller than the attachment position around which it is to be arranged.

Alternatively or additionally, the detachable member may be attached by a geometrical locking structure, such as a snap-fit solution, a threading, or another solution where the at least one flexible member is attached to the remaining part of the dome by matching structures on/at the flexible member and the remaining part of the dome.

To ensure that the at first and/or second flexible circumferential member does not flip or fold due to the flexibility during removal of the dome from the ear canal, at least one stiffening element may be attached at one side of at least one of the first and second flexible circumferential member. The at least one stiffening element may comprise one or more ribs attached to the backside of the flexible member. In this context, the backside of the flexible member is the side facing out of the ear canal, whereas the front side is facing into the ear canal. It should however be understood, that the stiffening element may also be attached to a front side of the flexible member.

Thus, the at least one stiffening member may comprise at least one rib extending between the one side of the at least one flexible circumferential member and an outer surface of the guiding structure.

The at least one stiffening element may also improve the robustness of the flexible circumferential member and thus prolong the lifetime hereof.

Furthermore, a stiffening element may be arranged on an outer side of the guiding structure to increase the robustness hereof.

According to a second aspect, the invention provides a method of protecting a sound output of a personal audio device, the method comprising the step of:
  providing a dome according to the first aspect of the invention,
  attaching the dome to the personal audio device so that the personal audio device can output sound in the guiding structure.

It should be understood, that a skilled person would readily recognise that any feature described in combination with the first aspect of the invention could also be combined with the second aspect of the invention, and vice versa.

The dome according to the first aspect of the invention is very suitable when performing the method steps according to the second aspect of the invention. The remarks set forth above in relation to the dome are therefore equally applicable in relation to the method.

According to a third aspect, the invention provides a method of modifying an acoustic response of a personal audio device, the method comprising the step of:
providing a dome according to the first aspect of the invention,
attaching the dome to the personal audio device so that the personal audio device can output sound in the guiding structure, the first and second flexible second members forming a second space having a volume of at least 10 mm3.

It should be understood, that a skilled person would readily recognise that any feature described in combination with the first aspect of the invention could also be combined with the third aspect of the invention, and vice versa.

The dome according to the first aspect of the invention is very suitable when performing the method steps according to the third aspect of the invention. The remarks set forth above in relation to the dome are therefore equally applicable in relation to the method.

According to a fourth aspect, the invention provides a dome for a personal audio device, the dome forming a first flexible circumferential member and comprising a guiding structure forming an interface for guiding sound from or to the personal audio device and for receiving a part of the personal audio device in an axial direction so that the personal audio device can output sound in the guiding structure, wherein the guiding structure comprises a least one sound opening configured for passage of sound received in the guiding structure from or to the personal audio device in a direction transverse to the axial direction out of the guiding structure.

It should be understood, that a skilled person would readily recognise that any feature described in combination with the first aspect of the invention could also be combined with the fourth aspect of the invention, and vice versa. The remarks set forth above in relation to the dome of the first aspect are therefore equally applicable in relation to the dome of the fourth aspect of the invention.

According to a fifth aspect, the invention provides a dome for a personal audio device, the dome forming a first flexible circumferential member, the dome further forming a second flexible circumferential member arranged at a distance from the first member to form a space between the first and second members, wherein the dome forms an interface for guiding sound from or to the personal audio device so that the personal audio device can output sound in the space or receive sound from the space, and wherein the first flexible member comprises at least one sound opening configured to output sound from the space.

It should be understood, that a skilled person would readily recognise that any feature described in combination with the first aspect of the invention could also be combined with the fifth aspect of the invention, and vice versa. The remarks set forth above in relation to the dome of the first aspect are therefore equally applicable in relation to the dome of the fifth aspect of the invention.

According to a sixth aspect, the invention provides a dome for a personal audio device, the dome forming a first flexible circumferential member, the dome further comprises a guiding structure forming an interface for guiding sound from or to the personal audio device, the dome further forming a second flexible circumferential member forming a space, wherein the guiding structure comprises a least one sound opening configured for passage of sound from or to the personal audio device to or from the space.

The dome may further comprise a flexible flap arranged in the space and being configured to at least partly close the sound opening during insertion of the dome into an ear canal of a user.

It should be understood, that a skilled person would readily recognise that any feature described in combination with the first aspect of the invention could also be combined with the sixth aspect of the invention, and vice versa. The remarks set forth above in relation to the dome of the first aspect are therefore equally applicable in relation to the dome of the sixth aspect of the invention.

According to a seventh aspect, the invention provides a personal audio device comprising a dome according to the first aspect of the invention and at least one receiver for generation of sound.

The personal audio device may further comprise at least on microphone for receiving acoustical signals.

It should be understood, that a skilled person would readily recognise that any feature described in combination with the first aspect of the invention could also be combined with the seventh aspect of the invention, and vice versa. The remarks set forth above in relation to the dome of the first aspect are therefore equally applicable in relation to the dome of the seventh aspect of the invention.

According to an eighth aspect, the invention provides a dome for a personal audio device, the dome forming a first flexible circumferential member configured for supporting the dome against an inner wall of an ear canal of a user, the dome further comprises a guiding structure extending in a longitudinal direction and forming an interface for guiding sound from the personal audio device, wherein the guiding structure comprises a least one sound outlet configured for passage of sound from the personal audio device in a direction transverse to the longitudinal direction out of the guiding structure.

It should be understood, that a skilled person would readily recognise that any feature described in combination with the first aspect of the invention could also be combined with the eighth aspect of the invention, and vice versa. The remarks set forth above in relation to the dome of the first aspect are therefore equally applicable in relation to the dome of the seventh aspect of the invention.

Furthermore, it should be understood, that any features of each of the aspects from one to eight may be combined with each of the other aspects from one to eight.

BRIEF DESCRIPTION OF THE DRAWINGS

Embodiments of the invention will now be further described with reference to the drawings, in which.

DETAILED DESCRIPTION OF THE INVENTION

It should be understood that the detailed description and specific examples, while indicating embodiments of the invention, are given by way of illustration only, since various changes and modifications within the spirit and scope of the invention will become apparent to those skilled in the art from this detailed description.

In the below description of embodiments of a dome, it is described that the guiding structure forms an interface for receiving a part of the personal audio device in an axial/longitudinal direction so that the personal audio device can output sound in the guiding structure. It should however be understood, that the interface it also configured for guidance of sound from the personal audio device. Furthermore, it should be understood, that the personal audio device may also receive sound from the guiding structure, and that the interface may be configured for guidance of sound to the personal audio device.

Figure 1A:
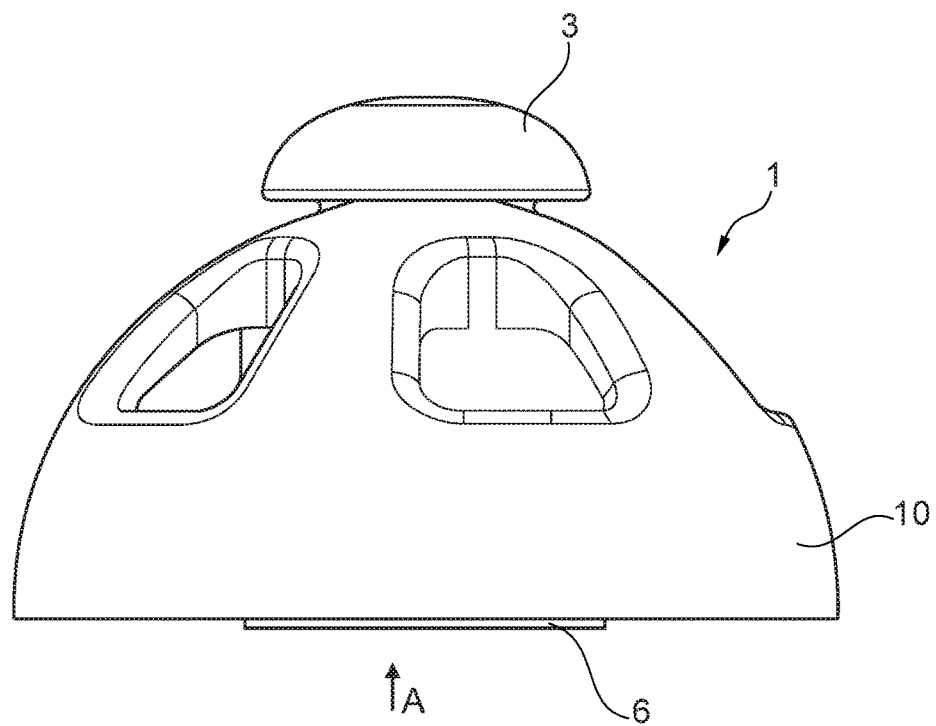
FIG. 1a illustrates an embodiment of a dome.
Figure 1B:
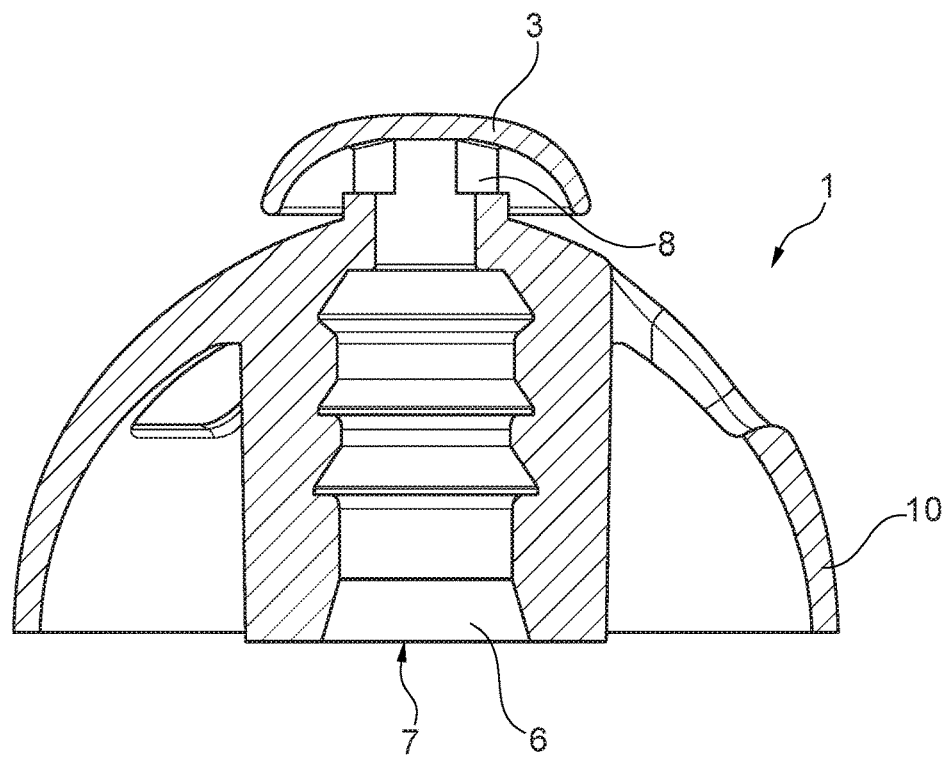
FIG. 1b illustrates a cross-section though the dome illustrated in FIG. 1a,
FIG. 2 illustrates an alternative embodiment of a dome.

FIGS. 1a and 1b illustrate an embodiment of a dome 1 for a personal audio device (not shown). The dome 1 forms a first flexible circumferential member 3.

The dome 1 further comprises a guiding structure 6 forming an interface 7 for receiving a part of the personal audio device in an axial/longitudinal direction (illustrated by the arrow A) so that the personal audio device can output sound in the guiding structure 6 and receive sound from the guiding structure.

The guiding structure 6 comprises a least one sound opening 8 configured for passage of sound received in the guiding structure 6 from the personal audio device in a direction transverse to the axial direction out of the guiding structure 6. By arranging the sound opening 8 so that the passage of sound is in a direction transverse to the axial direction, the ingress of debris, wax, etc. can be minimised as the transport way for debris to enter the personal audio device is not a straight transport way but changes direction due to the deviation of the transport way.

The dome 1 further forms a second flexible circumferential member 10 arranged at a distance from the first member 3. In the illustrated embodiment, the second flexible circumferential member 10 is configured for supporting the dome 1 against an inner wall.

The first flexible circumferential member 3 is configured to at least partly close the sound openings 8 during insertion of the dome 1 into an ear canal of a user. This is achieved by shaping the first flexible circumferential member so that is forms an overhang over the sound openings 8 and achieved by forming it of a flexible material whereby movement of the dome 1 into the ear canal may cause the first flexible circumferential member 3 to be pressed toward the sound openings 8 to at least partly close the sound opening during insertion.

Figure 2:
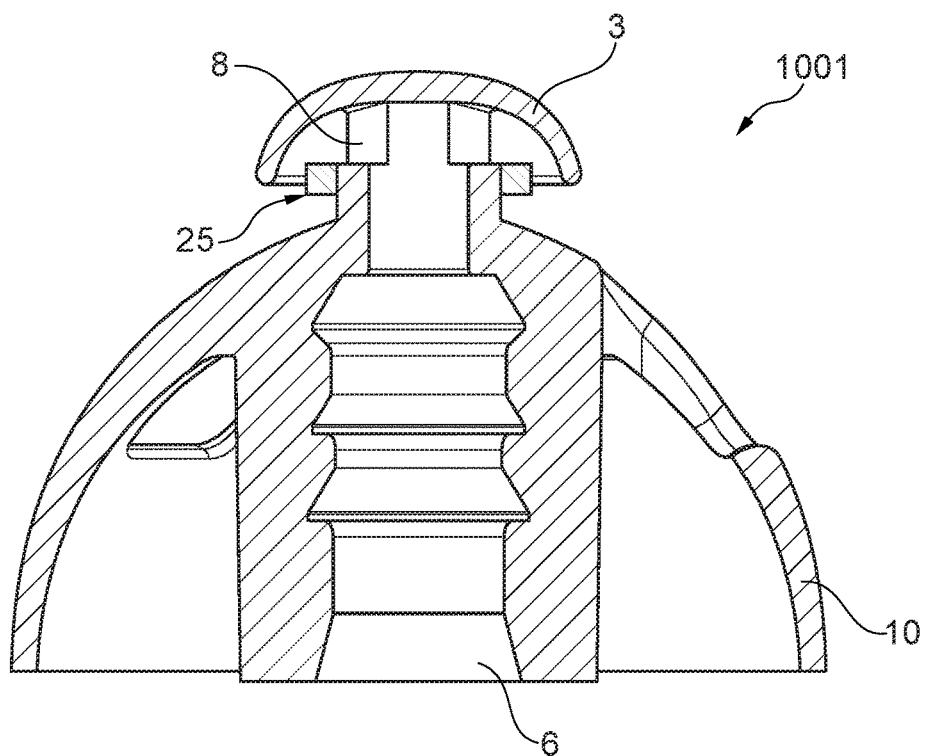

FIG. 2 illustrates an embodiment of a dome 1001 similar to the dome 1 illustrated in FIG. 1a. The dome 1001 further comprises a deviation member 25 arranged between the first flexible circumferential member 3 and the second flexible circumferential member 10. The deviation member 25 at least partly closes the sound openings 8, whereby the ingress of debris, wax, etc. can be minimised as the transport way for debris entering the personal audio device is not a straight transport way but changes direction since the deviation member may deviate the transport way. The deviation member 25 comprises a substantially circular rim portion extending around the guiding structure 6.

Figure 3:
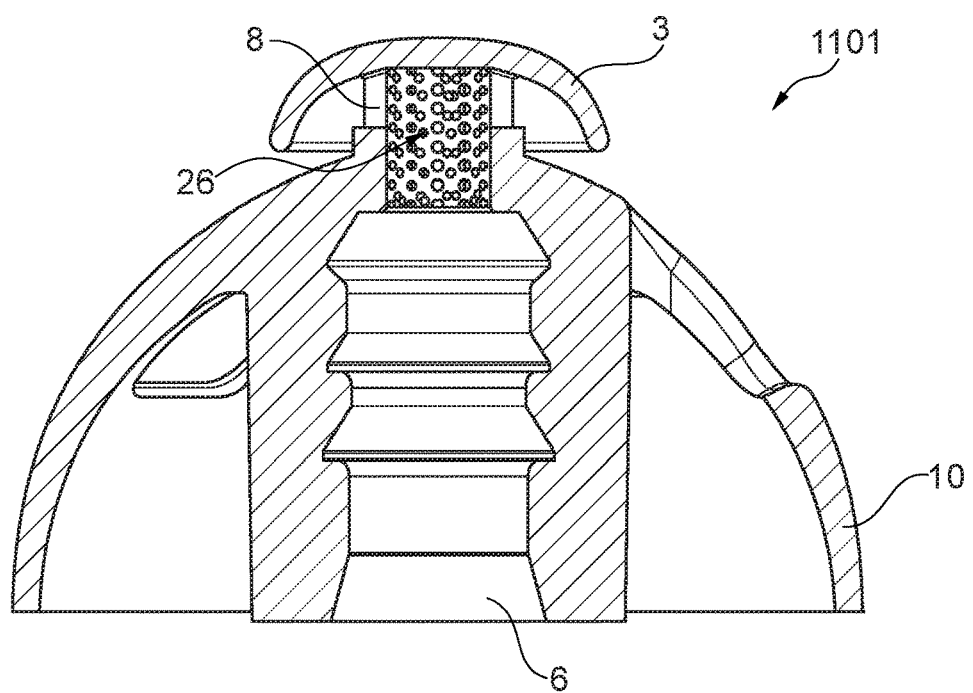
FIG. 3 illustrates a further alternative embodiment of a dome,
FIG. 4a schematically illustrates an embodiment of a dome,
FIG. 4b schematically illustrates an embodiment of a dome similar to that shown in FIG. 4a,
FIG. 5 schematically illustrates an alternative embodiment of a dome,
FIG. 6a schematically illustrates another embodiment of a dome, FIG. 6b schematically illustrates an embodiment of a dome similar to that shown in FIG. 6a, FIG. 7 schematically illustrates an embodiment of a dome.

FIG. 3 illustrates an embodiment of a dome 1101 similar to the dome 1 illustrated in FIG. 1a. The dome 1101 further comprises a porous element 26 arranged in the guiding structure 6 partly filling the sound openings 8. The porous element 26 being arranged adjacent to the first flexible circumferential member 3.

Figure 4A:
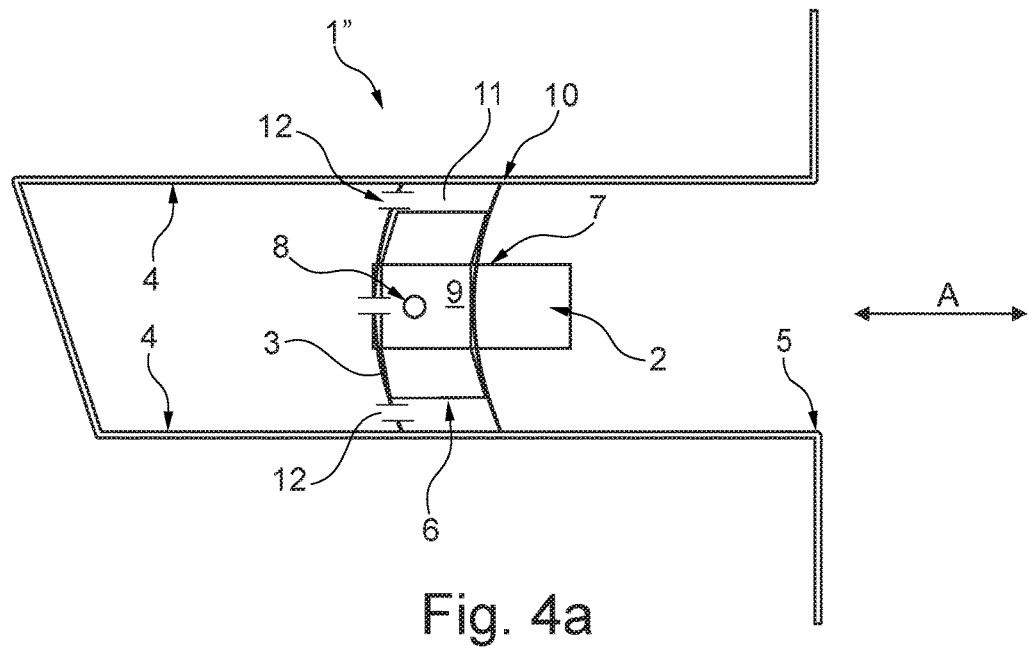
Figure 4B:
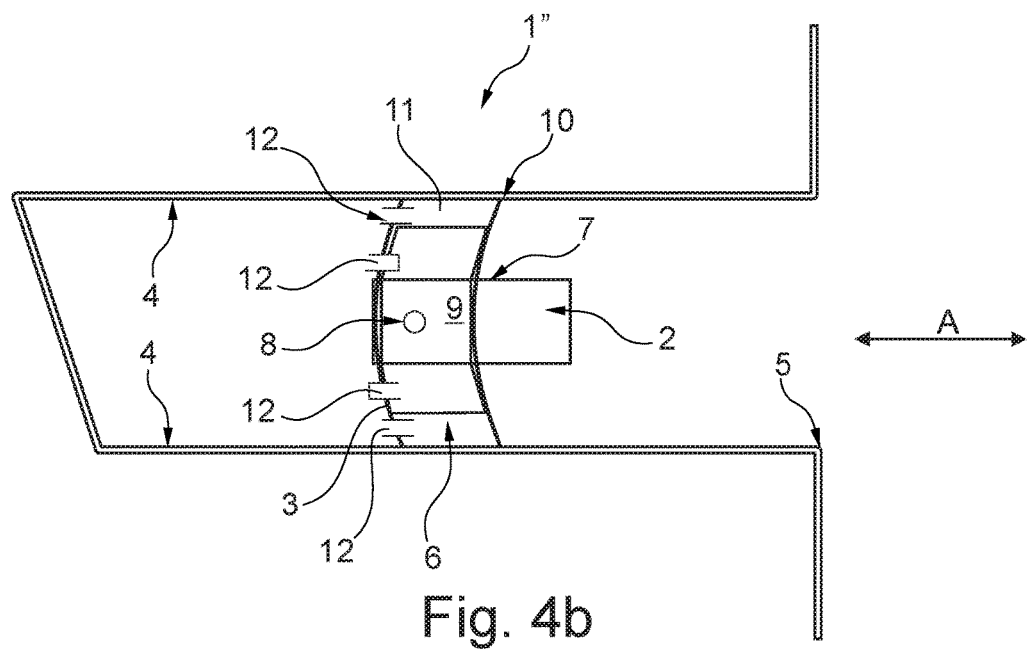

FIGS. 4a and 4b schematically illustrates two similar embodiments of a dome 1', 1" for a personal audio device 2. The dome 1' forms a first flexible circumferential member 3 configured for supporting the dome 1' against an inner wall 4 of an ear canal 5 of a user.

The dome 1' further comprises a guiding structure 6 forming an interface 7 for receiving a part of the personal audio device 2 in an axial/longitudinal direction (illustrated by the arrow A) so that the personal audio device 2 can output sound in the guiding structure 6.

The guiding structure 6 comprises a least one sound opening 8 configured for passage of sound received in the guiding structure 6 from the personal audio device 2 in a direction transverse to the axial direction out of the guiding structure 6. By arranging the sound opening 8 so that the passage of sound is in a direction transverse to the axial direction, the ingress of debris, wax, etc. can be minimised as the transport way for debris to enter the personal audio device 2 is not a straight transport way but changes direction due to the deviation of the transport way.

The guiding structure 6 forms an inner space 9 confined by the guiding structure 6 and the part of the personal audio device 2. Thus, the inner space 9 is formed inside the guiding structure 6.

The dome 1' further forms a second flexible circumferential member 10 arranged at a distance from the first member 3 to form a second space 11 between the first and second members. The second space 11 is arranged in communication with the guiding structure 6 via the sound opening 8.

In the illustrated embodiment, the second flexible circumferential member 10 is also configured for supporting the dome 1' against an inner wall 4 of an ear canal 5 of a user. Both the first and second flexible circumferential members can contact and seal the ear canal 5 when supporting the dome 1' against the inner wall 4.

The first flexible member 3 comprises plurality of openings 12 configured for sound passage from the second space 11 to the user of the personal audio device 2 through the guiding structure 6. The first flexible member 3 thus acts as wax protection system by increasing the complexity of the transport way of debris entering the guiding structure 6, since debris will first have to pass one of the openings 12 and subsequently the sound opening 8 of the guiding structure 6. Furthermore, the second space 11 between the first and second flexible members 3, 10 can prevent contact of the sound opening 8 with the ear canal wall 4, since the first and second member 3, 10 both are arranged circumferential to the guiding structure 6 and thus provide a distance to the inner wall 4.

The second space 11 is confined by an inner wall 4 of the ear canal, the first member 3, the second member 10, and the guiding structure 6.

The dome 1'' illustrated in FIG. 4b is similar to the embodiment of the dome 1' illustrated in FIG. 4a with the exception of the positioning of the openings 12.

Figure 5:
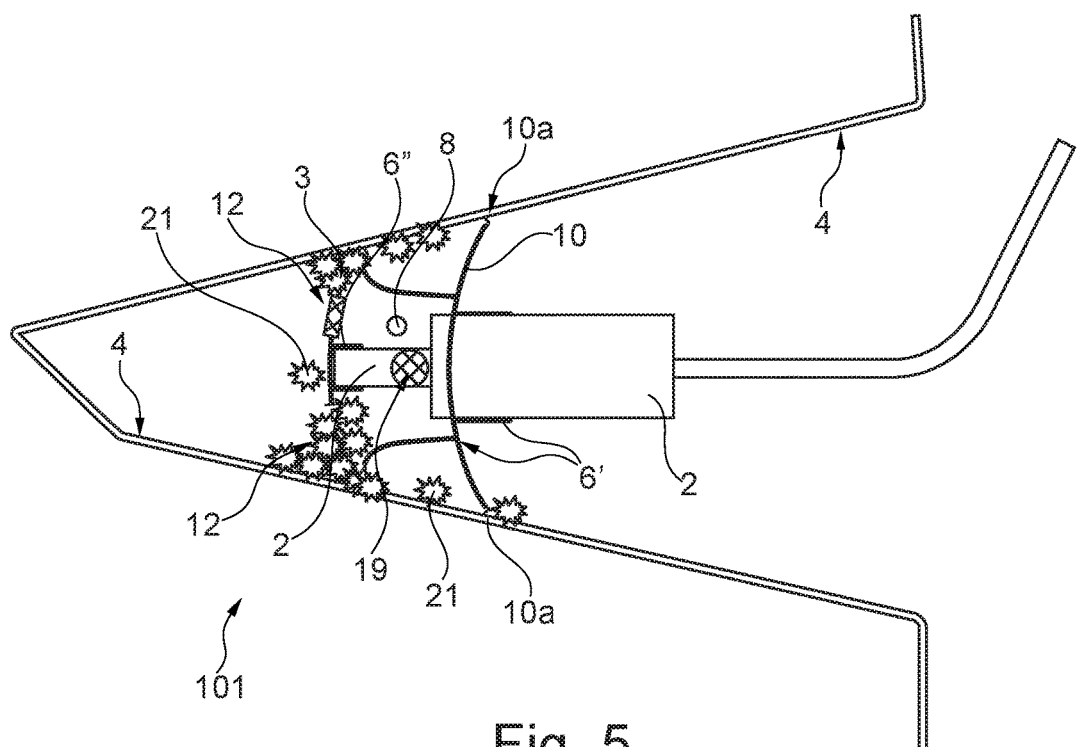

FIG. 5 schematically illustrates an alternative embodiment of a dome 101 for a personal audio device 2. The dome 101 forms a first flexible circumferential member 3 configured for supporting the dome 101 against an inner wall 4 of an ear canal 5 of a user.

The dome 101 further comprises a guiding structure 6 forming an interface 7 for receiving a part of the personal audio device 2 so that the personal audio device 2 can output sound in the guiding structure 6. In the illustrated embodiment, the guiding structure comprises two part 6', 6'' each forming in interface for receiving two different part of the personal audio device 2.

The guiding structure 6 comprises a least one sound opening 8 configured for passage of sound received in the guiding structure 6 from the personal audio device 2 in a direction transverse to the axial/longitudinal direction out of the guiding structure 6. The sound outlet opening 19 of the personal audio device 2 is provided with a grid to increase the protection against clogging of the sound outlet opening 19.

The guiding structure 6 forms an inner space 9 confined by the guiding structure 6 and the part of the personal audio device 2.

The dome 101 further forms a second flexible circumferential member 10 arranged at a distance from the first member 3 to form a second space 11 between the first and second members.

In the illustrated embodiment, the second flexible circumferential member 10 is more flexible at an outer edge 10a to improve the sealing along the inner wall 4.

The first flexible member 3 comprises plurality of opening 12 configured for sound passage from the second space 11 to the user of the personal audio device 2. The openings 12 are also provided with a grid to increase protection of the sound opening 8.

Potential built-up of cerumen 21 along the inner wall 4 of the ear canal 5 and on the first flexible member is also illustrated in FIG. 5.

Figure 6A:
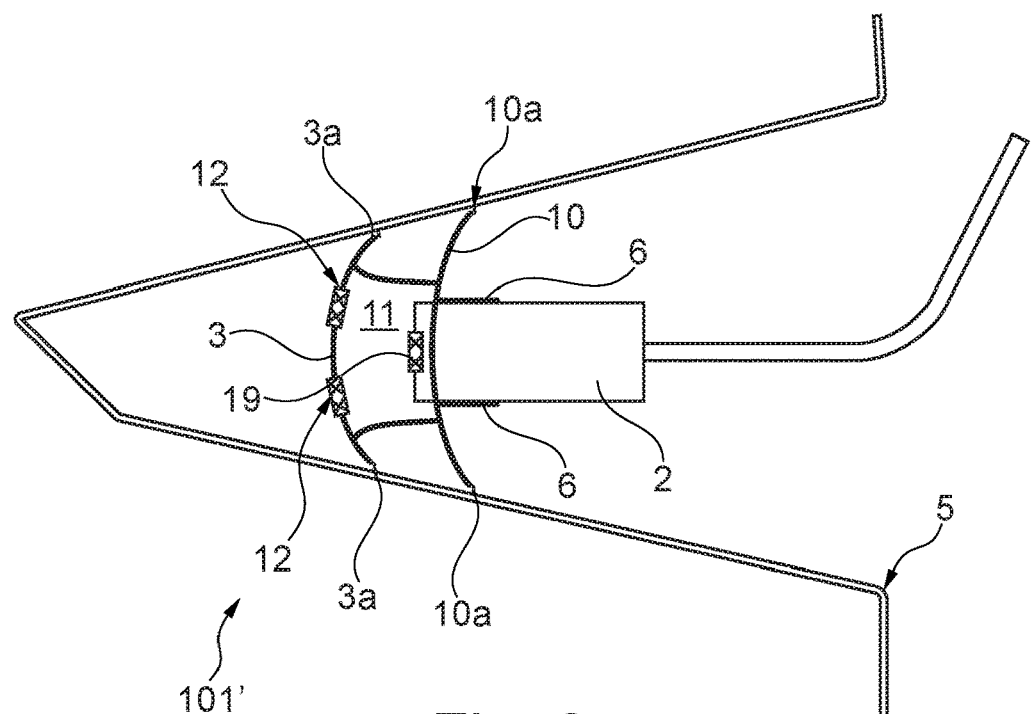
Figure 6B:
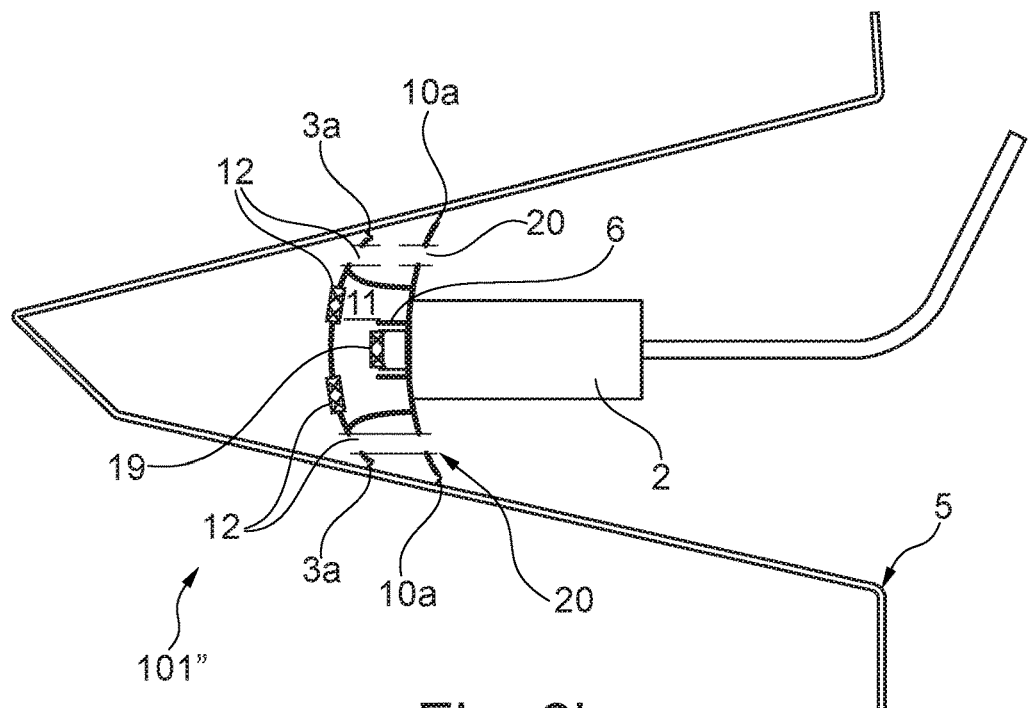

FIGS. 6a and 6b schematically illustrate two embodiments of a dome 101' and 101'' similar to the embodiment of the dome 101 illustrated in FIG. 5. The dome 101', 101'' forms a first flexible circumferential member 3 and a second flexible member 10.

The dome 101' further comprises a guiding structure 6. The dome 101' forms a first flexible circumferential member 3 and a second flexible circumferential member 10 arranged at a distance from the first member to thereby forms a second space 11 between the first and second members, so that the personal audio device 2 can output sound in the second space 11 via the sound outlet opening 19.

In the illustrated embodiment, the first and second flexible circumferential members 3, 10 are more flexible at an outer edge 3a, 10a to improve the sealing along the inner wall 4.

The first flexible member 3 comprises plurality of opening 12 configured for sound passage. In the embodiment in FIG. 3b, also the second flexible member 10 comprises a plurality of openings 12. The openings 12 are provided with a grid to increase protection of the sound opening.

Figure 7:
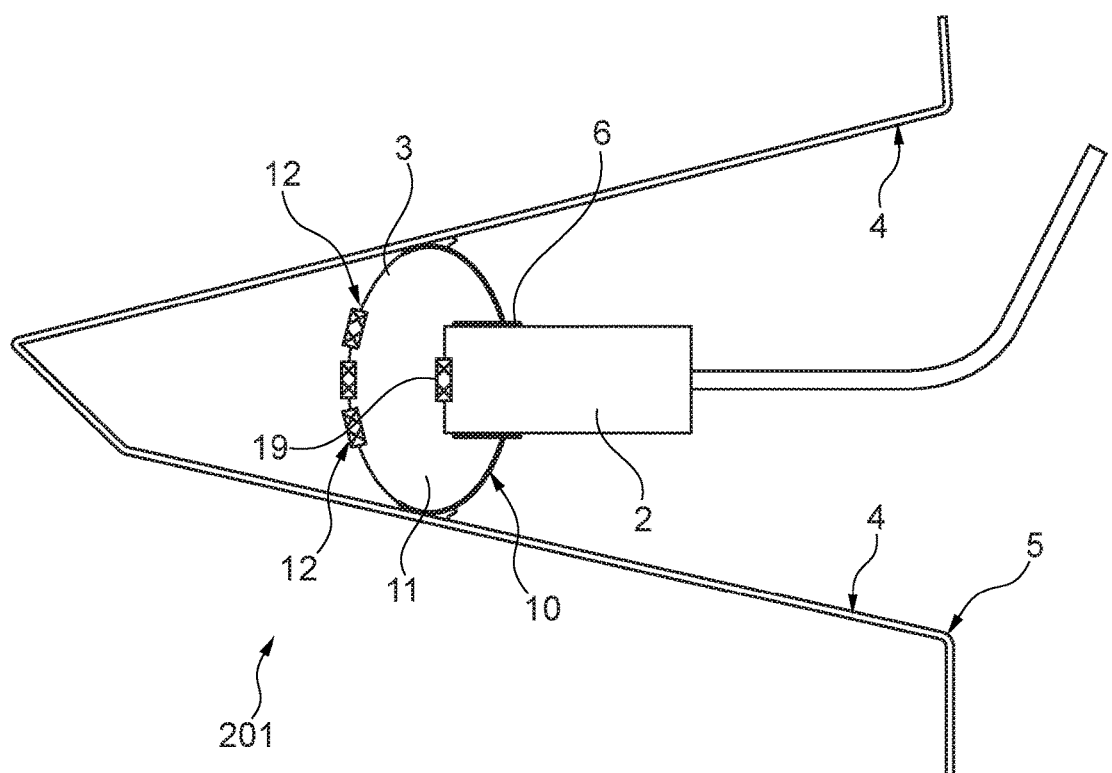

FIG. 7 schematically illustrates an embodiment of a dome 201 for a personal audio device 2. The dome 201 forms a first flexible circumferential member 3 and a second flexible member 10.

The dome 201 further comprises a guiding structure 6. The dome 201 forms a first flexible circumferential member 3 and a second flexible circumferential member 10 arranged at a distance from the first member to thereby forms a second space 11 between the first and second members, so that the personal audio device 2 can output sound in the second space 11 via the sound outlet opening 19.

In the illustrated embodiment, the first and second flexible circumferential members 3, 10 are of different thickness and thus possess different flexibilities. Furthermore, the first and second flexible circumferential members 3, 10 are joined alone there outer edges to form a balloon-like second space 11.

The first flexible member 3 comprises plurality of opening 12 configured for sound passage. The openings 12 are provided with a grid to increase protection of the sound opening.

FIGS. 8-11 illustrate different embodiments of a guiding structure 6 of a dome (not shown). The guiding structure 6 forms an interface 7 for receiving a part of the personal audio device (not shown) in an axial/longitudinal direction (illustrated by the arrow A) so that the personal audio device can output sound in the guiding structure 6.

The guiding structure 6 is in the illustrated embodiments formed as an elongated tubular structure, where the interface 7 for receiving a part of the personal audio device includes an opening at one end of the guiding structure. At the opposite end 13 the guiding structure is closed so that sound can only propagate out of the guiding structure 6 via the opening 8.

The guiding structure 6 comprises a sound opening 8 configured for passage of sound received in the guiding structure 6 from the personal audio device in a direction transverse to the axial/longitudinal direction out of the guiding structure 6.

Figure 8:
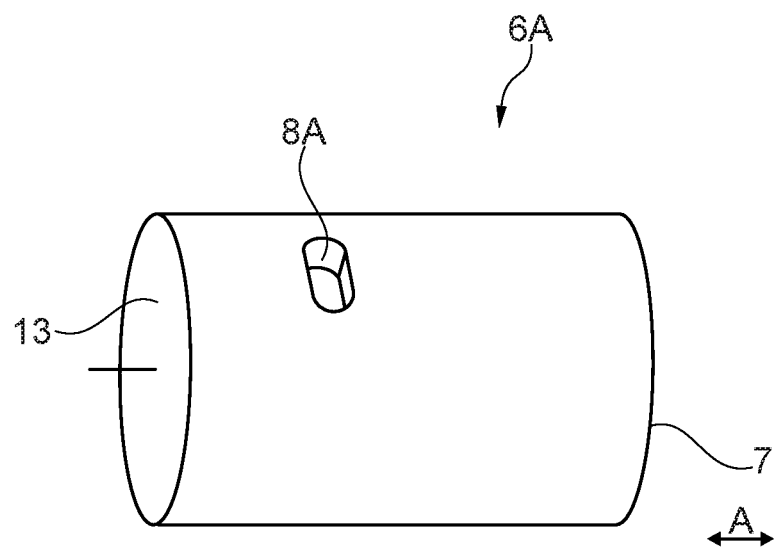
FIGS. 8-11 illustrate different embodiments of a guiding structure of a dome.

In FIG. 8, the sound opening 8A is an elongated opening.

Figure 9:
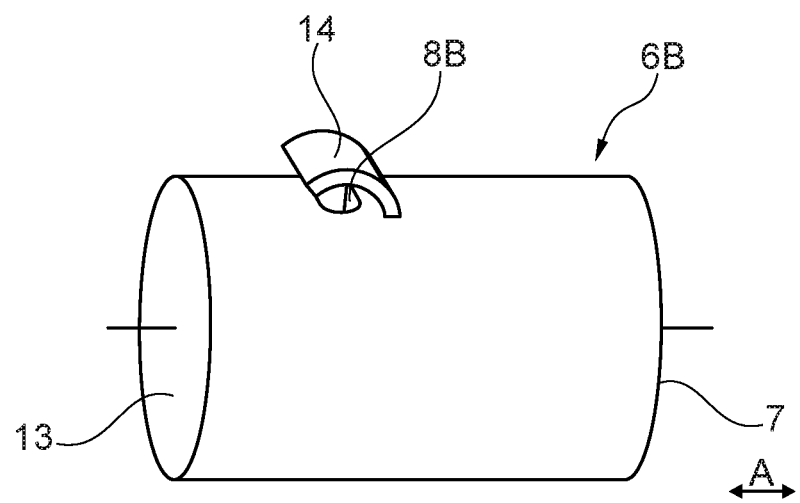

In FIG. 9, the sound opening 8B is an elongated opening covered partly by a flexible flap 14. The flexible flap 14 is configured to prevent contact with the ear canal and deviate cerumen from the opening 8B during removal of the dome from the ear canal, as movement of the guiding structure 6B towards the right in the drawing may cause the flexible flap 14 to be press against the opening 8B and thus at least partly close the opening to deviate debris/cerumen from the opening to limit the risk of debris, wax, etc. to be pressed into the guiding structure via the opening when removing a dome with the guiding structure 6A out of an ear canal.

Figure 10:
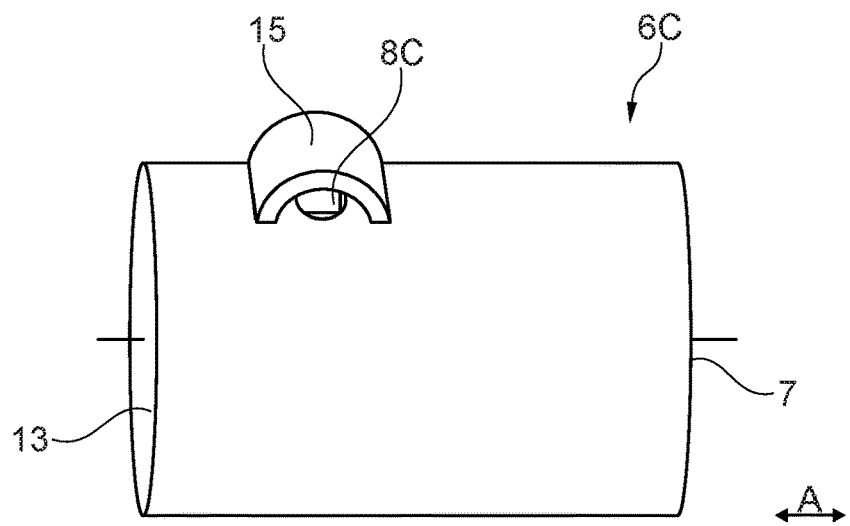

In FIG. 10, the sound opening 8C is an elongated opening covered partly by a bridge-like structure 15. The bridge-like structure 15 is configured to protect the opening 8C during insertion and removal of the dome from the ear canal, whereby the risk of debris, wax, etc. being pressed into the guiding structure via the opening can be reduced.

Figure 11:
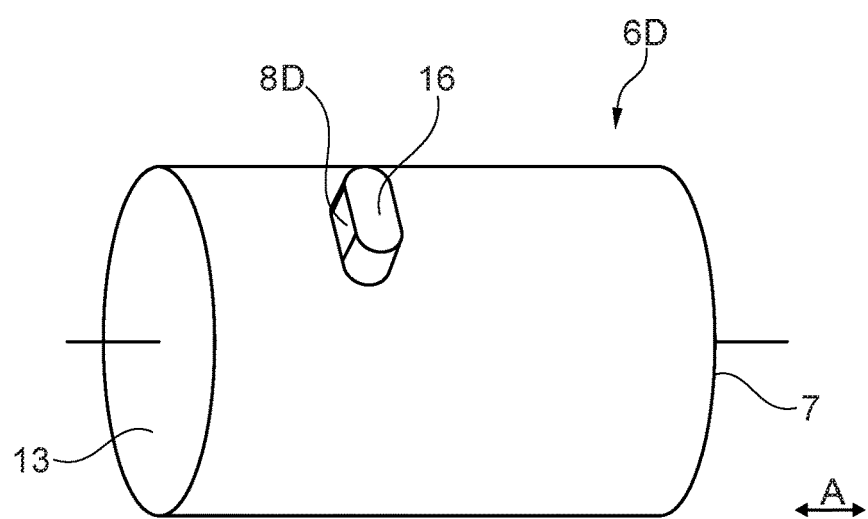

In FIG. 11, the sound opening 8D is an elongated opening into which a porous element 16 has been inserted. The porous element 16 allows sound to propagate out of the opening 8D, but limits the risk of ingress of debris into the guiding structure 6D.

Figure 12:
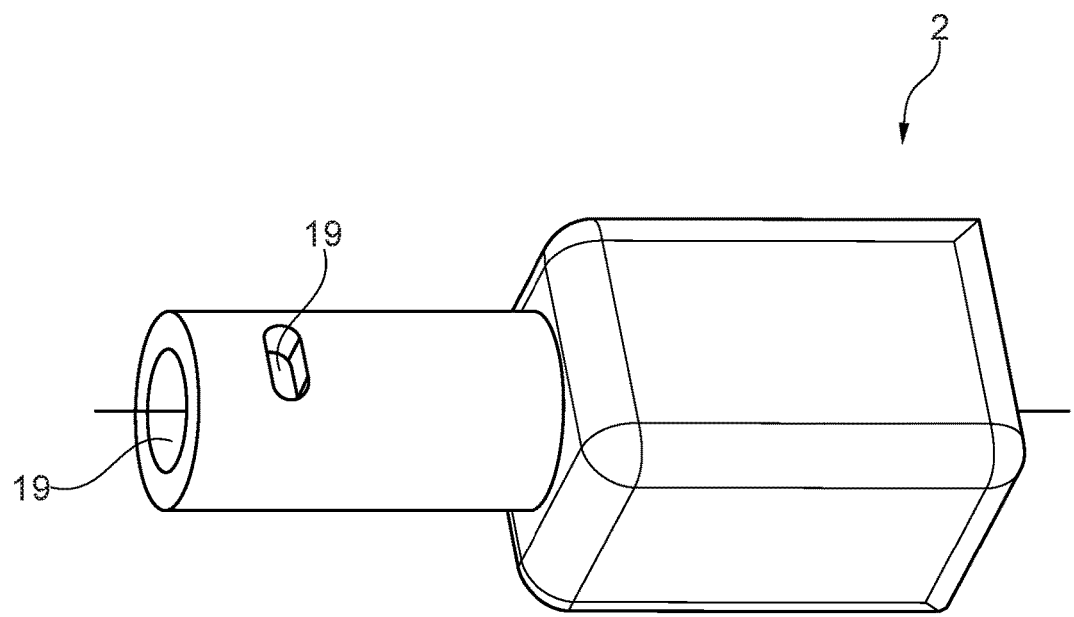
FIG. 12 illustrates a personal audio device.

FIG. 12 illustrate a personal audio device 2 comprising two sound outlet openings 19.

Figure 13:
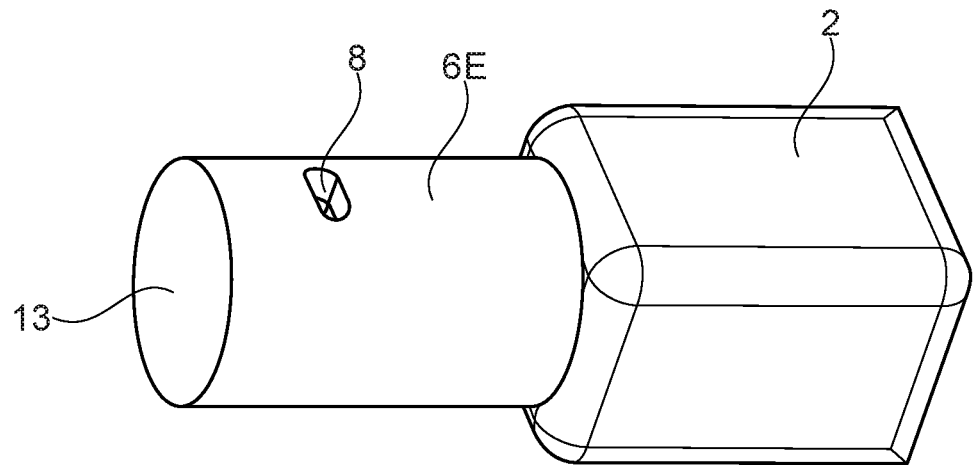
FIGS. 13-14 illustrate different embodiment of a guiding structure and a part of a personal audio device.
Figure 14:
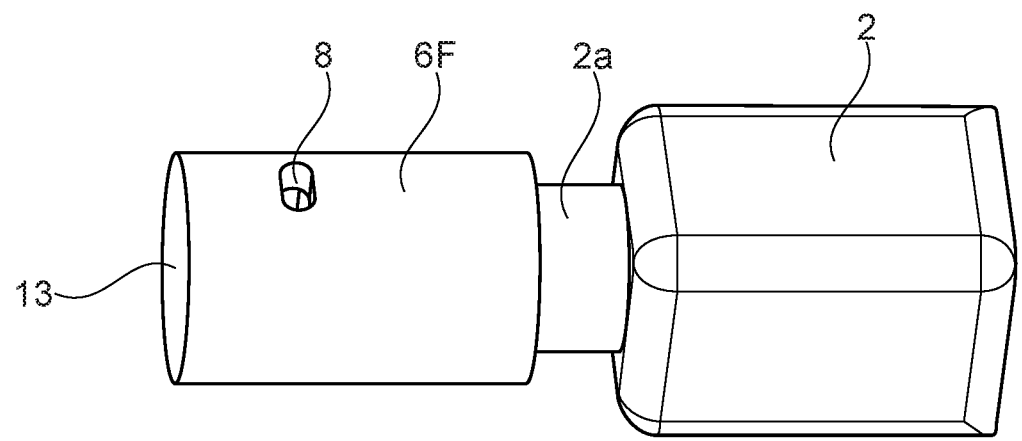

FIGS. 13 and 14 illustrate two different embodiments of a guiding structure 6 and a part of a personal audio device 2. The guiding structure 6 forms an interface (not shown) for receiving a part of the personal audio device 2 in an axial/longitudinal direction so that the personal audio device can output sound in the guiding structure 6.

The guiding structure 6 is in the illustrated embodiments formed as an elongated tubular structure, where the interface for receiving a part of the personal audio device includes an opening at one end of the guiding structure. At the opposite end 13 the guiding structure is closed so that sound can only propagate out of the guiding structure 6 via the opening 8.

The guiding structure 6 comprises a least one sound opening 8 configured for passage of sound received in the guiding structure 6 from the personal audio device 2 in a direction transverse to the axial/longitudinal direction out of the guiding structure 6.

The guiding structures 6E and 6F in FIGS. 13 and 14, are similar and both has a circular outer shape. However, in FIG. 13, the personal audio device 2 is inserted deeper into the guiding structure 6E compared to the insertion of the personal audio device 2 into the guiding structure 6F. This is illustrated by the neck portion 2a of the personal audio device 2 being visible in FIG. 14. Thus, an inner space 9 is formed by the inner walls of the guiding structure 6F and a part of the personal audio device 2.

In FIG. 13, the personal audio device 2 has a sound outlet opening (not shown) arranged on the side to match the sound opening 8 of the guiding structure 6E.

In FIG. 14, the personal audio device 2 has a sound outlet opening (not shown) which can communicate with the sound opening 8 via the inner space 9.

Figure 15:
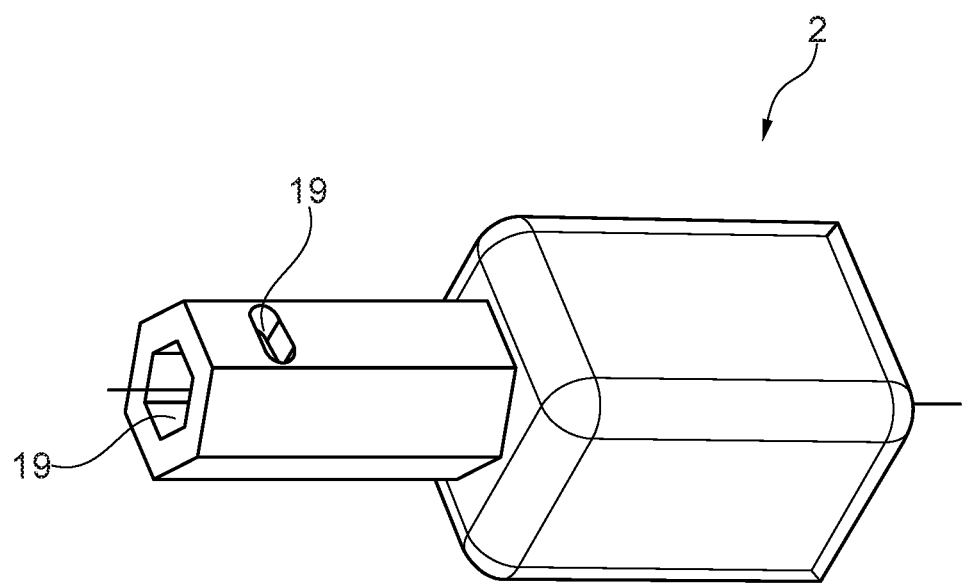
FIGS. 15-16 illustrate different personal audio devices.
Figure 16:
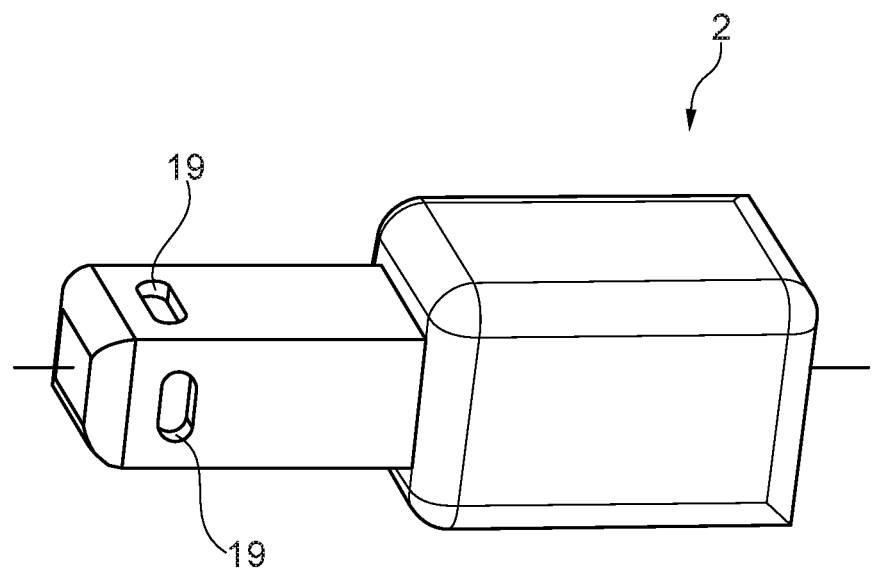

FIGS. 15 and 16 illustrate two different personal audio devices 2 comprising a plurality of sound outlet openings 19.

In FIG. 15, the personal audio device 2 has an outer shape forming a hexagon. One sound outlet opening 19 is arranged at the side of the device 2, whereas another sound outlet opening 19 is arranged in the front of the device.

The personal audio device 2 illustrated in FIG. 16, has an outer surface being square-shaped. The illustrated embodiment in FIG. 16 further has a plurality of sound outlet openings 19 all being configured for passage of sound to a guiding structure in a direction transverse to the axial/longitudinal direction.

Figure 17A:
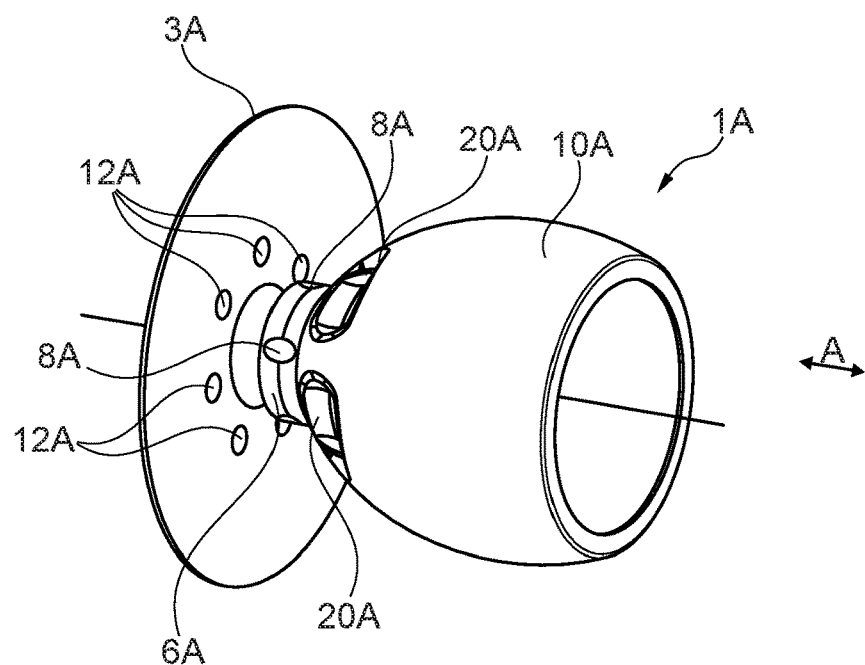
FIG. 17a illustrates an embodiment of a dome in a first view.
Figure 17B:
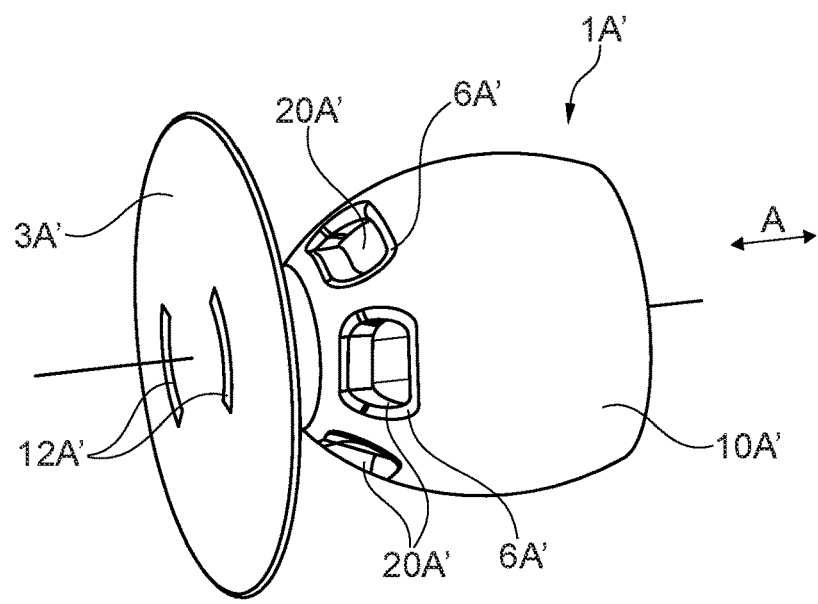
FIG. 17b illustrates the dome shown in FIG. 17a in a second view.

FIGS. 17a and 17b illustrate two similar embodiments of a dome 1A for a personal audio device (not shown). The dome 1A forms a first flexible circumferential member 3A configured for supporting the dome 1A against an inner wall of an ear canal of a user.

The dome 1A further comprises a guiding structure 6A forming an interface (not shown) for receiving a part of the personal audio device in an axial/longitudinal direction (illustrated by the arrow A) so that the personal audio device can output sound in the guiding structure 6A.

The guiding structure 6A comprises a plurality of sound openings 8A configured for passage of sound received in the guiding structure 6A from the personal audio device in a direction transverse to the axial/longitudinal direction out of the guiding structure 6.

The first flexible member 3A comprises plurality of openings 12A configured for sound passage from the personal audio device via the sound openings 8A.

The first flexible member 3A thus acts as wax protection system by increasing the complexity of the transport way of debris entering the guiding structure 6A, since debris will first have to pass one of the openings 12A and subsequently one of the sound openings 8A of the guiding structure 6A.

Furthermore, the flexible circumferential member 3A is of a size which allows the member 12A to cover the sound openings 8A when the flexible member 3A is folded and pressed against the guiding structure 6A. Consequently, the first flexible member 3A may act as a flexible cover configured to at least partly close the openings 8A during insertion of the dome 1A into the ear canal, as movement of the dome 1A inwardly into the ear canal may cause the first flexible member 3A to be press against the openings 8A and thus at least partly close the openings to deviate debris/cerumen from the openings to limit the risk of debris, wax, etc. to be pressed into the guiding structure via the openings when inserting the dome 1A into an ear canal.

Furthermore, the dome 1A comprises a second flexible member 10A which comprises plurality of openings 20A configured for sound passage. By providing the second flexible member 10A which a plurality of openings 20A, an open acoustic situation can be created in the ear when the dome 1A is inserted in an ear canal and at least the first flexible member 3A provides a seal against an inner wall of the ear canal (not shown).

The dome 1A' illustrated in FIG. 17b is similar to the embodiment of the dome 1A illustrated in FIG. 17a with the exception of the size and the shape of the openings 12A'. In the embodiment illustrated in FIG. 17a, the openings 12A are circular opening positioned in a circle, whereas the openings 12A' have an elongated shape.

In FIG. 17b, the guiding structure 6A' is visible through the opening 20A' of the second flexible member 10A'. The sound openings of the guiding structure 6A' configured for passage of sound received in the guiding structure 6A' from the personal audio device in a direction transverse to the axial/longitudinal direction out of the guiding structure 6 cannot be seen in FIG. 17b.

Figure 18A:
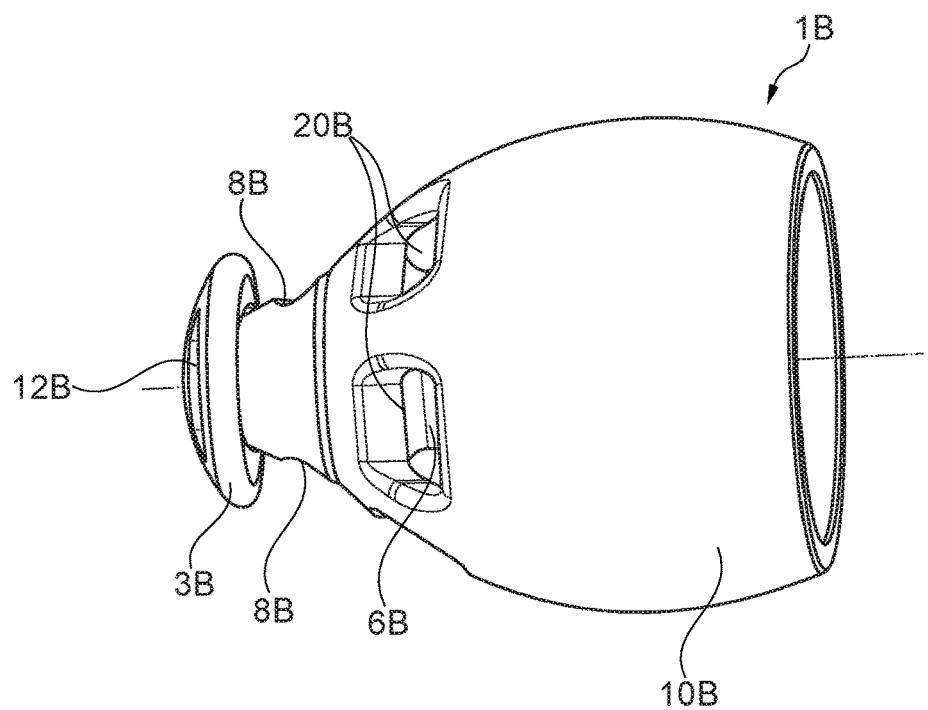
FIG. 18a illustrates an embodiment of a dome in a first view.
Figure 18B:
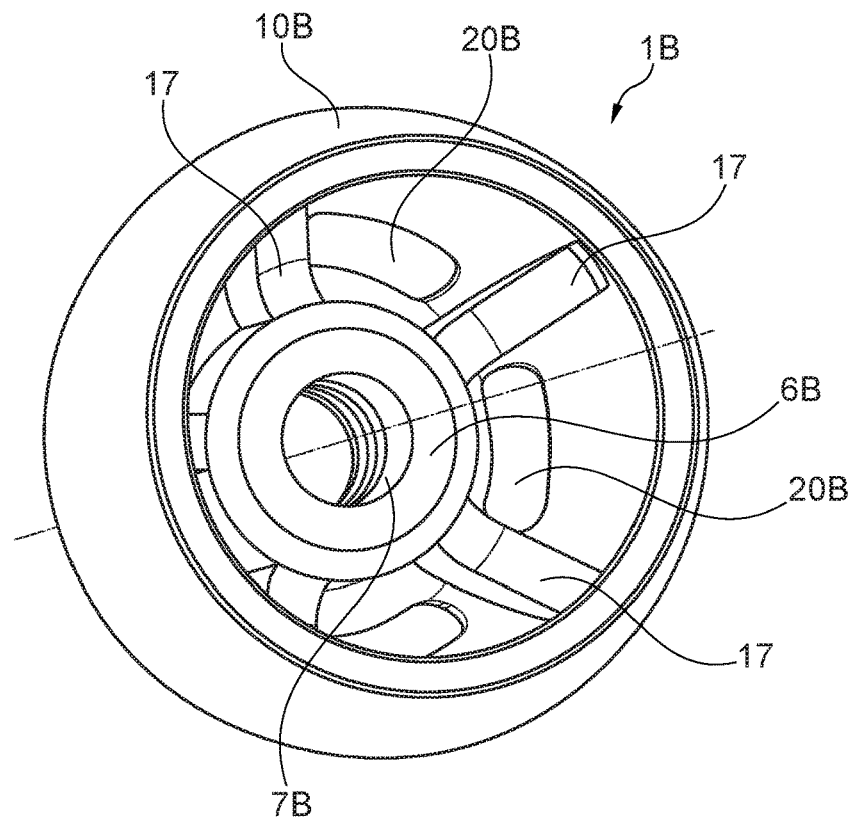
FIG. 18b illustrates the dome shown in FIG. 18a in a second view.

FIGS. 18a and 18b illustrate an embodiment of a dome 1B for a personal audio device (not shown). The dome 1B forms a first flexible circumferential member 3B configured to at least partly close the sound openings 8B during insertion of the dome 1B.

The dome 1B further comprises a guiding structure 6B forming an interface 7B for receiving a part of the personal audio device in an axial/longitudinal direction. In FIG. 18a, the guiding structure 6B is visible through the openings 20B.

The guiding structure 6B comprises two sound openings 8B configured for passage of sound received in the guiding structure 6B from the personal audio device in a direction transverse to the axial/longitudinal direction out of the guiding structure 6B. The sound openings 8B are located on opposite sides of the guiding structure 6B.

Furthermore, the dome 1B comprises a second flexible member 10B which comprises plurality of openings 20B configured for sound passage from the personal audio device via the sound openings 8B. The second flexible member 10B is configured to support the dome 1B against an inner wall of an ear canal.

To ensure that the at second flexible member 10B does not flip or fold due to the flexibility during removal and/or insertion of the dome 1B, a plurality of stiffening elements 17 in the form of ribs are arranged at the inner side the second flexible member 10B. The ribs 17 are only visible in FIG. 18b.

Figure 19A:
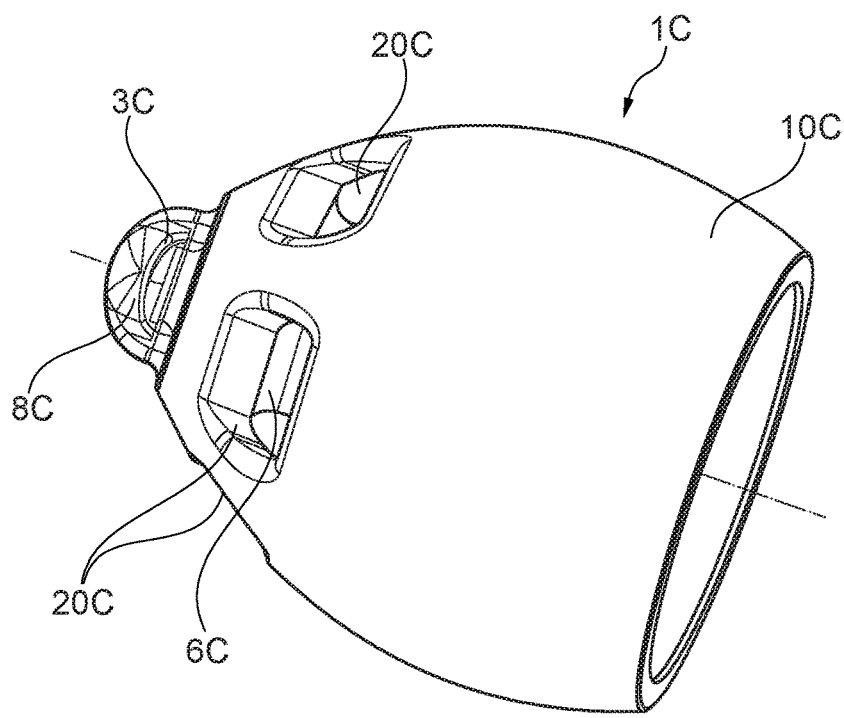
FIG. 19a illustrates an embodiment of a dome in a first view.
Figure 19B:
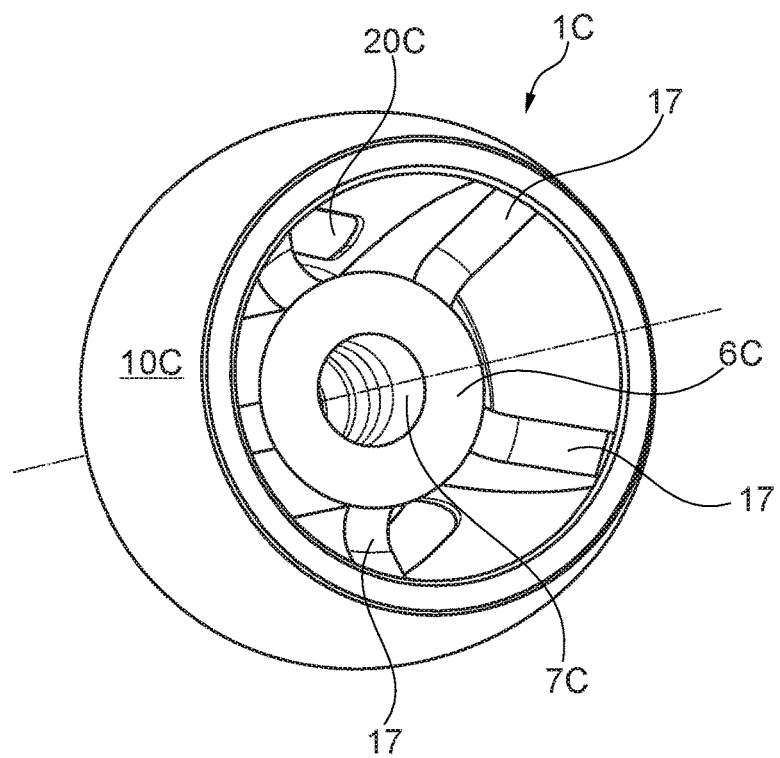
FIG. 19b illustrates the dome shown in FIG. 19a in a second view.

FIGS. 19a and 19b illustrate an alternative embodiment of a dome 1C for a personal audio device (not shown). The dome 1C is similar to the dome 1I illustrated in FIGS. 25a and 25b. The dome 1C forms a first flexible circumferential member 3C. The dome 1C is similar to the dome 1B except of the size and shape of the first flexible member 3C.

The dome 1C further comprises a guiding structure 6C forming an interface 7C for receiving a part of the personal audio device in an axial/longitudinal direction. In FIG. 19a, the guiding structure 6C is visible through the openings 20C.

The guiding structure 6C comprises two sound openings 8C configured for passage of sound received in the guiding structure 6B from the personal audio device in a direction transverse to the axial/longitudinal direction out of the guiding structure 6C.

The first flexible member 3C is formed as a bridge-like structure covering an additional sound opening (not shown) in the end 13 of the guiding structure 6C. The first flexible member in the form of a bridge-like structure 3C is configured to protect the additional sound opening during insertion of the dome 1C into the ear canal, whereby the risk of debris, wax, etc. being pressed into the guiding structure 6C via the additional sound opening can be reduced.

Figure 20A:
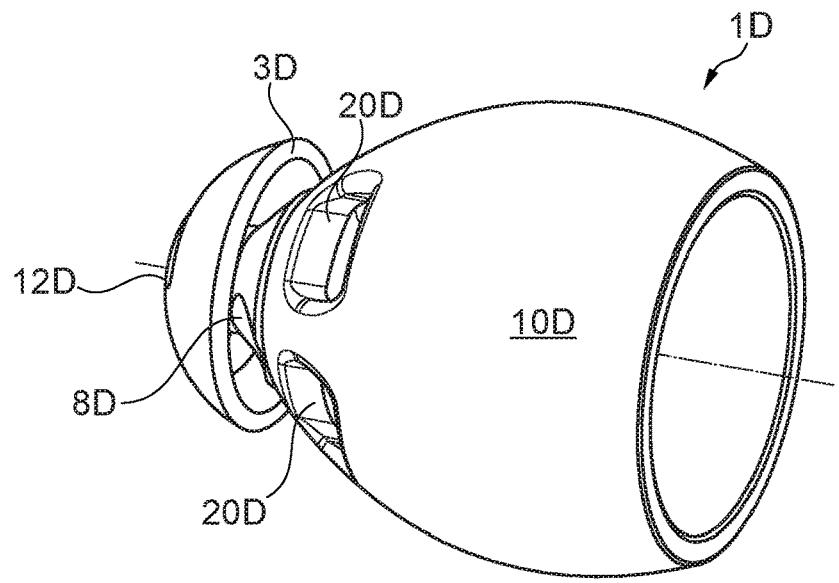
FIG. 20a illustrates an embodiment of a dome in a first view.
Figure 20B:
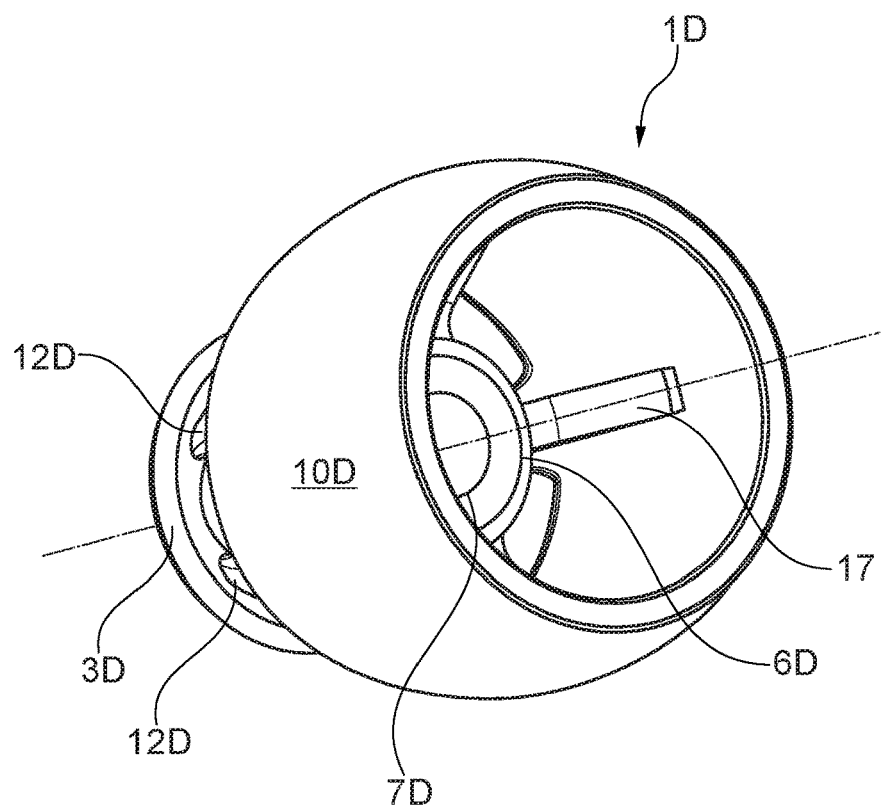
FIG. 20b illustrates the dome shown in FIG. 20a in a second view.

FIGS. 20a and 20b illustrate an alternative embodiment of a dome 1D for a personal audio device (not shown). The dome 1D forms a first flexible circumferential member 3D configured to at least partly close the sound openings 8D. The dome 1D is similar to the dome 1C except of the size and shape of the first flexible member 3D.

The dome 1D comprises a guiding structure 6D forming an interface 7D for receiving a part of the personal audio device in an axial/longitudinal direction. The guiding structure 6D is only visible in FIG. 20b.

The guiding structure 6D comprises two sound openings 8D (of which only one is shown) configured for passage of sound received in the guiding structure 6D from the personal audio device in a direction transverse to the axial/longitudinal direction out of the guiding structure 6D.

The first flexible member 3D is formed as a stud-like member protruding at the front part of the dome 1D in the insertion/axial/longitudinal direction. The first flexible member 3D comprises two openings 12D for passage of sound. By off-setting the openings 12D relative to the sound opening 8D in two directions; i.e. to the side and to the front, the transport way for wax changes direction and the risk of ingress of cerumen can be reduced.

Figure 21A:
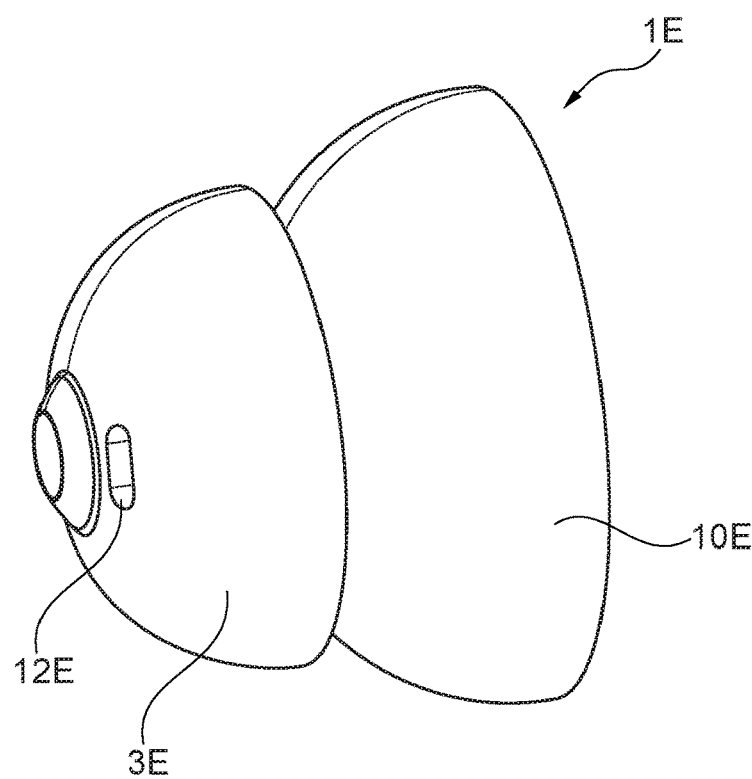
FIG. 21a illustrates an embodiment of a dome in a first view.
Figure 21B:
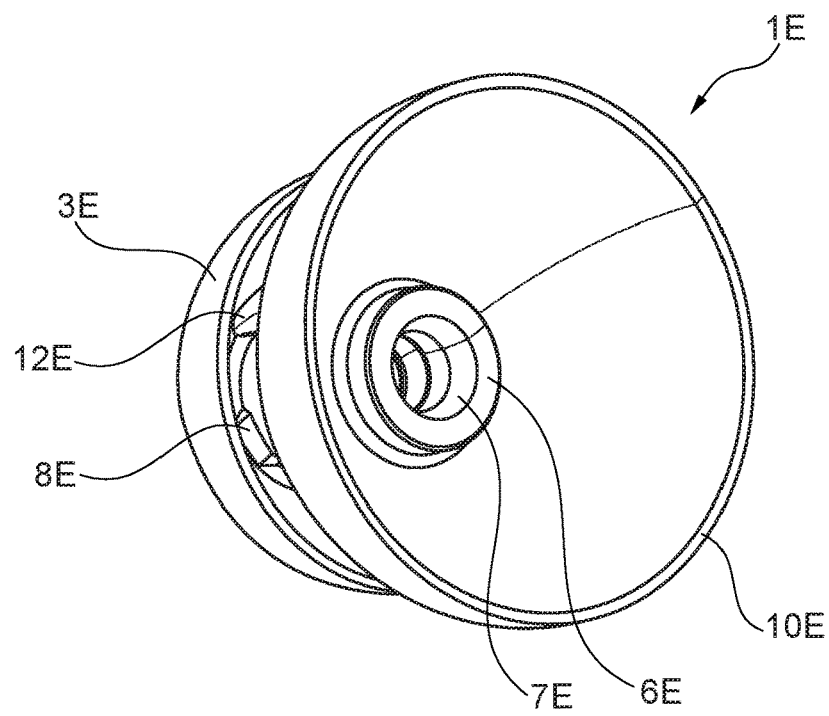
FIG. 21b illustrates the dome shown in FIG. 21a in a second view.

FIGS. 21a and 21b illustrate an embodiment of a dome 1E for a personal audio device (not shown). The dome 1E forms a first flexible circumferential member 3E configured to at least partly close the sound openings 8E.

The dome 1E further comprises a guiding structure 6E forming an interface 7E for receiving a part of the personal audio device in an axial/longitudinal direction.

The guiding structure 6E comprises a plurality of sound openings 8E configured for passage of sound received in the guiding structure 6E from the personal audio device in a direction transverse to the axial/longitudinal direction out of the guiding structure 6E.

Furthermore, the first flexible member 3E comprises an opening 12E configured for sound passage from the personal audio device via the sound openings 8E. By off-setting the opening 12E relative to the sound opening 8E in two directions; i.e. to the side and to the front, the transport way for wax changes direction and the risk of ingress of cerumen can be reduced.

Figure 22A:
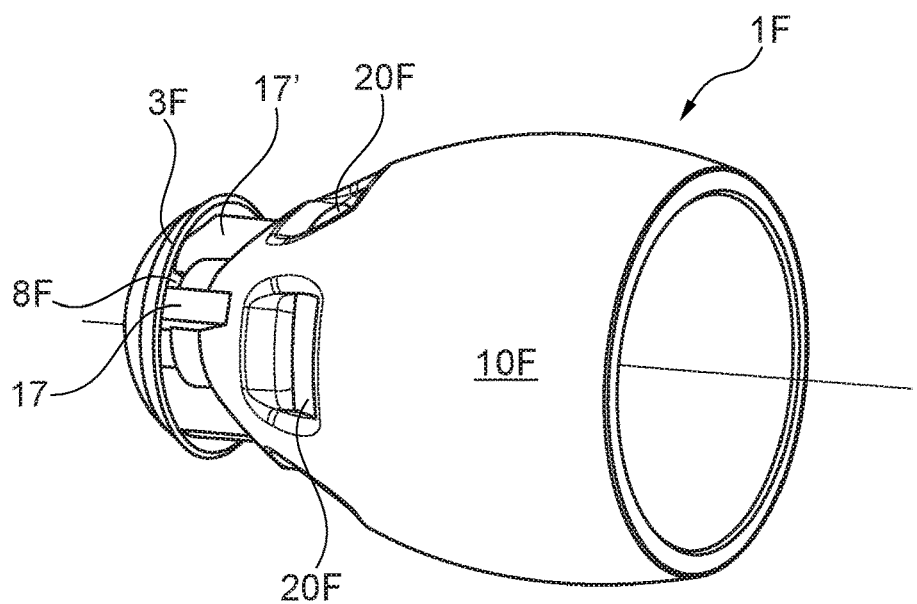
FIG. 22a illustrates an embodiment of a dome in a first view, and FIG. 22b illustrate the dome shown in FIG. 22a in a second view.
Figure 22B:
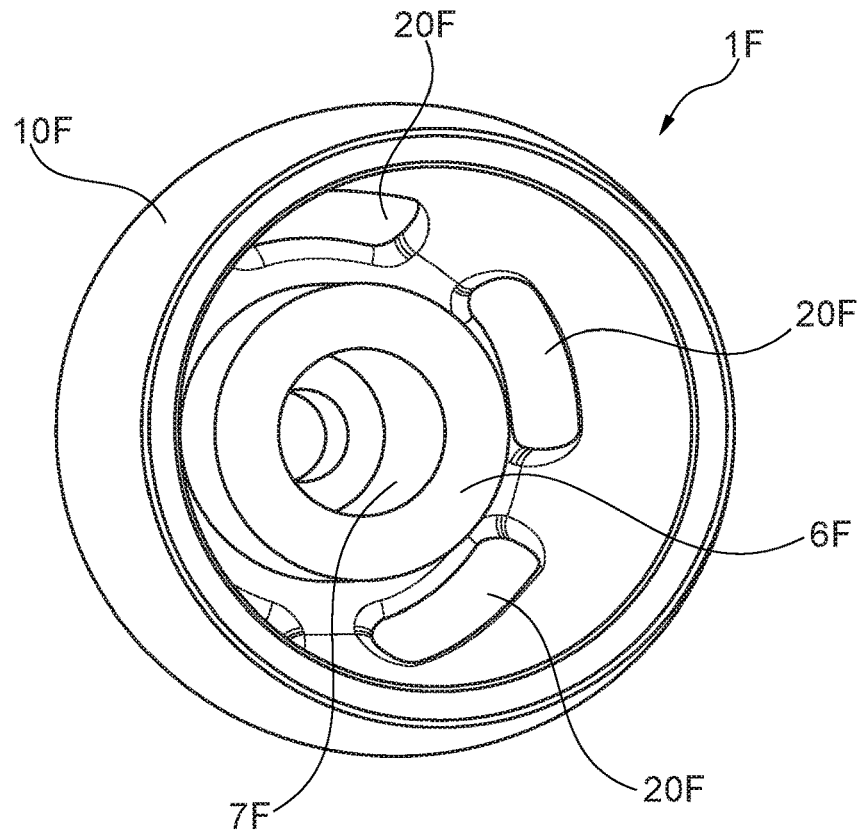

FIGS. 22a and 22b illustrate an alternative embodiment of a dome 1F for a personal audio device (not shown). The dome 1F forms a first flexible circumferential member 3F configured to at least partly close the openings 8F. The dome 1F is similar to the dome 1D except of the size and shape of the first flexible member 3F.

The dome 1F comprises a guiding structure 6F forming an interface 7F for receiving a part of the personal audio device in an axial/longitudinal direction. The guiding structure 6F is only visible in FIG. 22b.

The guiding structure 6F comprises a sound opening 8F configured for passage of sound received in the guiding structure 6F from the personal audio device in a direction transverse to the axial/longitudinal direction out of the guiding structure 6F.

The first flexible member 3F is formed as a stud-like member protruding at the front part of the dome 1F in the insertion direction. The first flexible member 3F comprises openings (not shown) for passage of sound.

Furthermore, the first flexible member 3F comprises a plurality of stiffening elements 17' in the form of ribs arranged at the inner side the first flexible member.

Figure 23A:
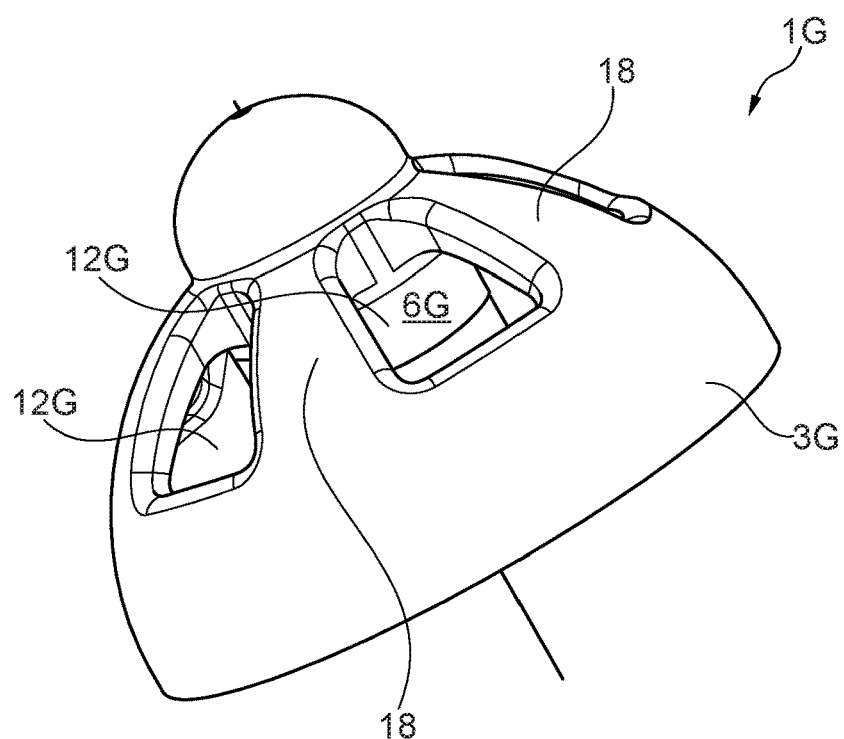
FIG. 23a illustrates an embodiment of a dome in a first view.
Figure 23B:
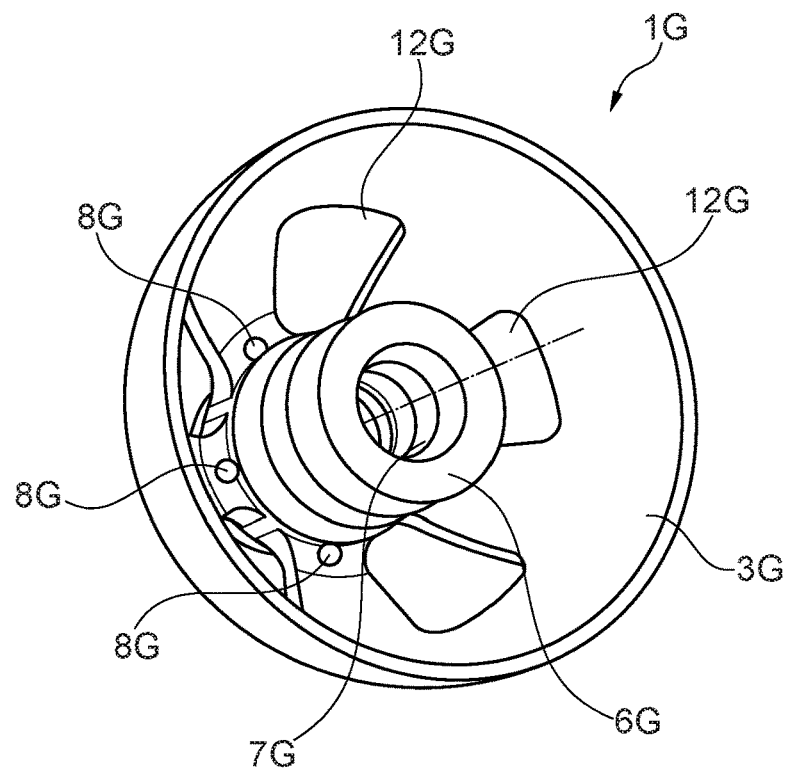
FIG. 23b illustrates the dome shown in FIG. 23a in a second view.

FIGS. 23a and 23b illustrate an embodiment of a dome 1G for a personal audio device (not shown). The dome 1G forms a first flexible circumferential member 3G configured for supporting the dome 1G against an inner wall of an ear canal of a user.

The dome 1G further comprises a guiding structure 6G forming an interface 7G for receiving a part of the personal audio device in an axial/longitudinal direction so that the personal audio device can output sound in the guiding structure 6G. In FIG. 23a, the guiding structure 6G is visible through the openings 12G.

The guiding structure 6G comprises a plurality of sound openings 8G configured for passage of sound received in the guiding structure 6G from the personal audio device in a direction transverse to the axial/longitudinal direction out of the guiding structure 6G. Each of the sound openings 8G is positioned behind an intermediate part 18 formed between two adjacent opening 12G of the first flexible member 3G and forming part of the first flexible member 3G.

The first flexible member 3G comprises plurality of openings 12G configured for sound passage from the personal audio device via the sound openings 8G.

Figure 24A:
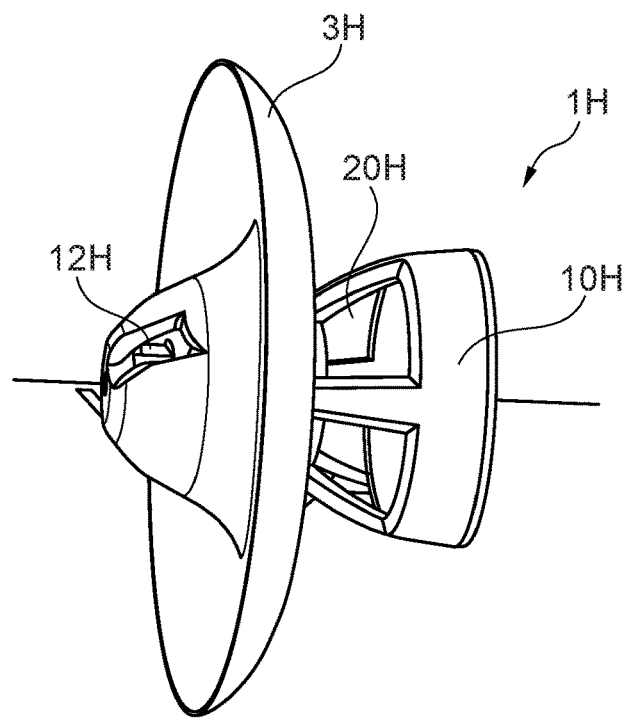
FIG. 24a illustrates an embodiment of a dome in a first view.
Figure 24B:
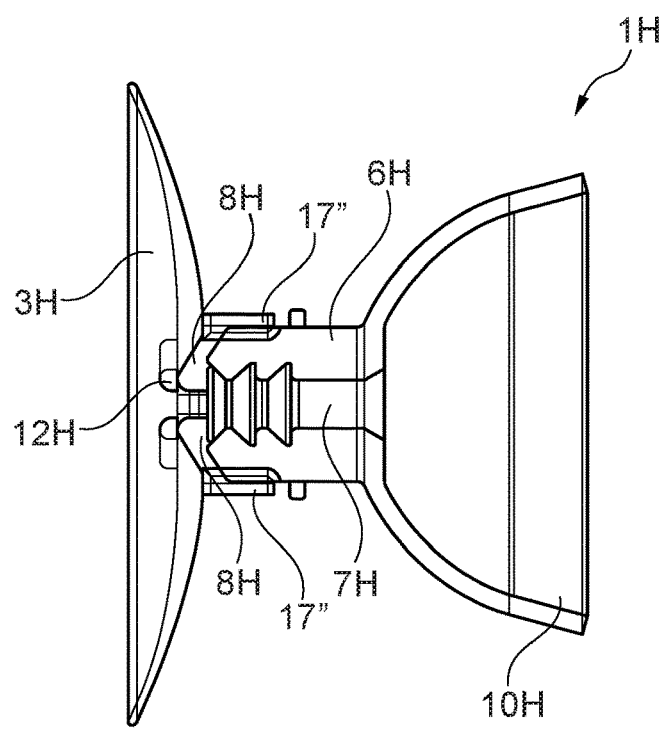
FIG. 24b illustrates the dome shown in FIG. 24a in a second view.

FIGS. 24a and 24b illustrate an embodiment of a dome 1H for a personal audio device (not shown). The dome 1H forms a first flexible circumferential member 3H configured for supporting the dome 1H against an inner wall of an ear canal of a user and configured to at least partly close the openings 8H during insertion of the dome 1H into an ear canal.

The dome 1H further comprises a guiding structure 6H forming an interface 7H for receiving a part of the personal audio device in an axial/longitudinal direction so that the personal audio device can output sound in the guiding structure 6H. The guiding structure 6H is visible in the cross-section illustrated in FIG. 24b.

The guiding structure 6H comprises two sound openings 8H configured for passage of sound received in the guiding structure 6H from the personal audio device in a direction transverse to the axial/longitudinal direction out of the guiding structure 6H.

The first flexible member 3H comprises two openings 12H configured for sound passage from the personal audio device via the sound openings 8H. To increase the strength of the first flexible member 3H, the first flexible member further comprises stiffening elements 17" in the form of ribs. The ribs 17" also partially blocks the transport way of cerumen to the sound openings 8H as the transport way is extended and deviated due to the ribs 17" arranged adjacent to the sound openings 8H.

The first flexible member 3H has a curved convex shape to increase comfort of a user, as this shape will improve the flexibility of the flexible member during insertion of the dome into an ear canal. Furthermore, the curved convex shape may assist a user during insertion, as the larger convex part may help finding the ear canal and aligning herewith.

Additionally, due to the curved shape of the first flexible member 3H, the area covered by the first flexible member 3H is increased compared to the area covered by traditional wax barriers and thereby improves the possibility of deviating wax without increasing the outer diameter of the first flexible member 3H.

Furthermore, the dome 1H comprises a second flexible member 10H which comprises four openings 20H configured for sound passage. By providing the second flexible member 10H which a plurality of openings 20H, an open acoustic situation can be created in the ear when the dome 1H is inserted in an ear canal and at least the first flexible member 3H provides a seal against an inner wall of the ear canal (not shown)

The sound openings 8H and the openings 20H can be at least partly covered by the first flexible member 3H acting as a flexible flap configured to at least partly close the sound openings 8H and the openings 20H during insertion and of the dome 1H into the ear canal, as movement of the dome 1H into of the ear canal may cause the first flexible member 3H to be pressed against the second flexible member 10H to at least partly close the sound openings 8H and the openings 20H to limit the risk of debris, wax, etc. to be pressed into the guiding structure 6H via the sound openings and openings during insertion.

Figure 25A:
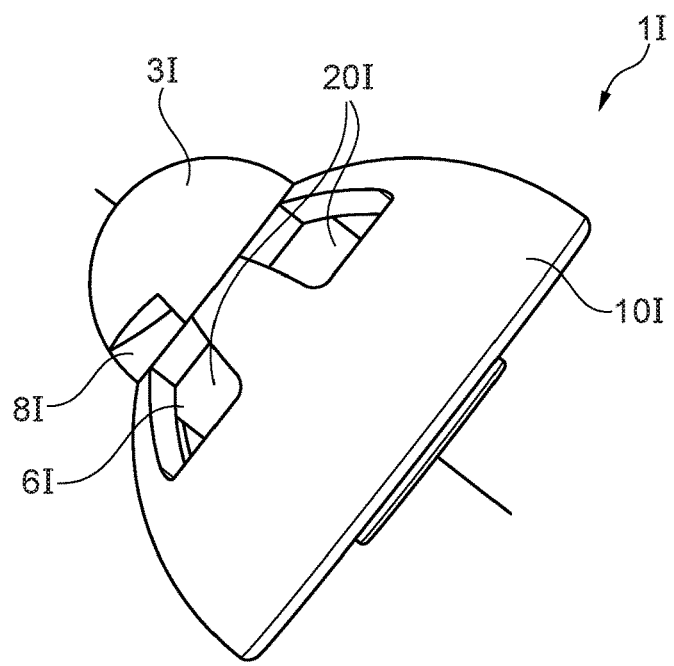
FIG. 25a illustrates an embodiment of a dome in a first view.
Figure 25B:
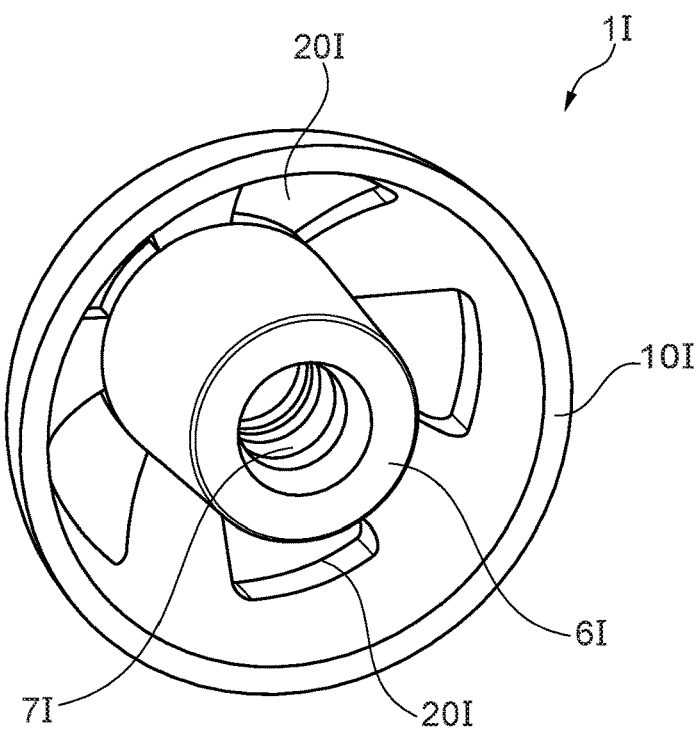
FIG. 25b illustrates the dome shown in FIG. 25a in a second view.

FIGS. 25a and 25b illustrate an embodiment of a dome 11 for a personal audio device (not shown). The dome 11 forms a first flexible circumferential member 31, and a second flexible circumferential member 10H configured for supporting the dome 11 against an inner wall of an ear canal of a user. The second flexible member 101 comprises five openings 201 configured for sound passage from the personal audio device via the sound opening 81.

The dome 11 further comprises a guiding structure 61 forming an interface 71 for receiving a part of the personal audio device in an axial/longitudinal direction so that the personal audio device can output sound in the guiding structure 61. In FIG. 25a, the guiding structure 61 is visible through the openings 201.

The guiding structure 61 comprises a sound opening 81 configured for passage of sound received in the guiding structure 61 from the personal audio device in a direction transverse to the axial/longitudinal direction out of the guiding structure 6G.

Figure 26A:
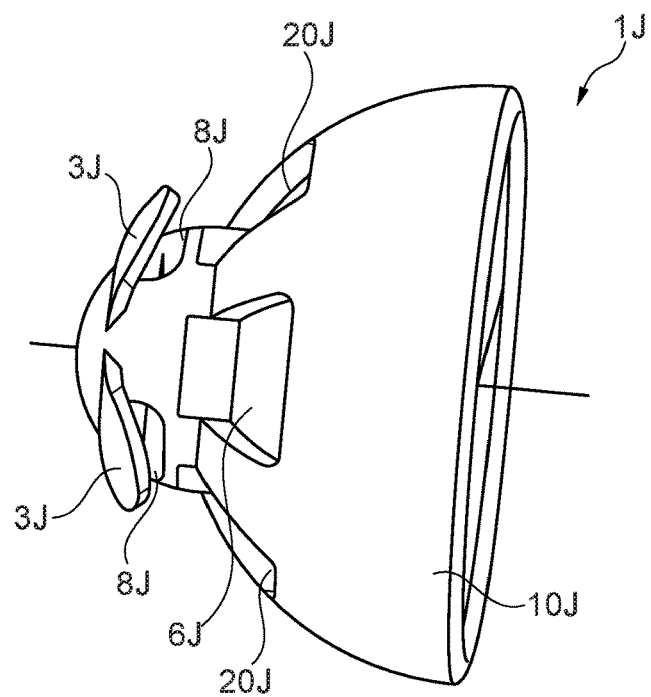
FIG. 26a illustrates an embodiment of a dome in a first view.
Figure 26B:
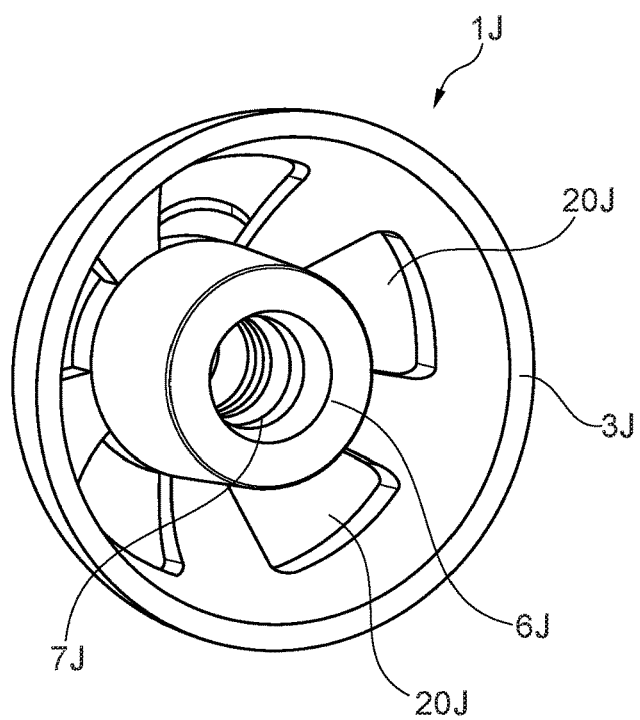
FIG. 26b illustrates the dome shown in FIG. 26a in a second view.

FIGS. 26a and 26b illustrate an embodiment of a dome 1J for a personal audio device (not shown). The dome 1J forms a first flexible circumferential member 3J configured to at least partly cover the openings 8J during insertion of the dome 1J, and a second circumferential member 10J for supporting the dome 1J against an inner wall of an ear canal of a user. The second flexible member 10J comprises five openings 20J configured for sound passage from the personal audio device via the sound opening 8J.

The dome 1J further comprises a guiding structure 6J forming an interface 7J for receiving a part of the personal audio device in an axial/longitudinal direction so that the personal audio device can output sound in the guiding structure 6J. In FIG. 26a, the guiding structure 61 is visible through the openings 201.

The guiding structure 6J comprises a plurality of sound openings 8J configured for passage of sound received in the guiding structure 6J from the personal audio device in a direction transverse to the axial/longitudinal direction out of the guiding structure 6J.

Furthermore, the first flexible member 3J comprising a plurality of flexible flap configured to at least partly close the sound openings 8J during insertion of the dome 1J from the ear canal.

Figure 27:
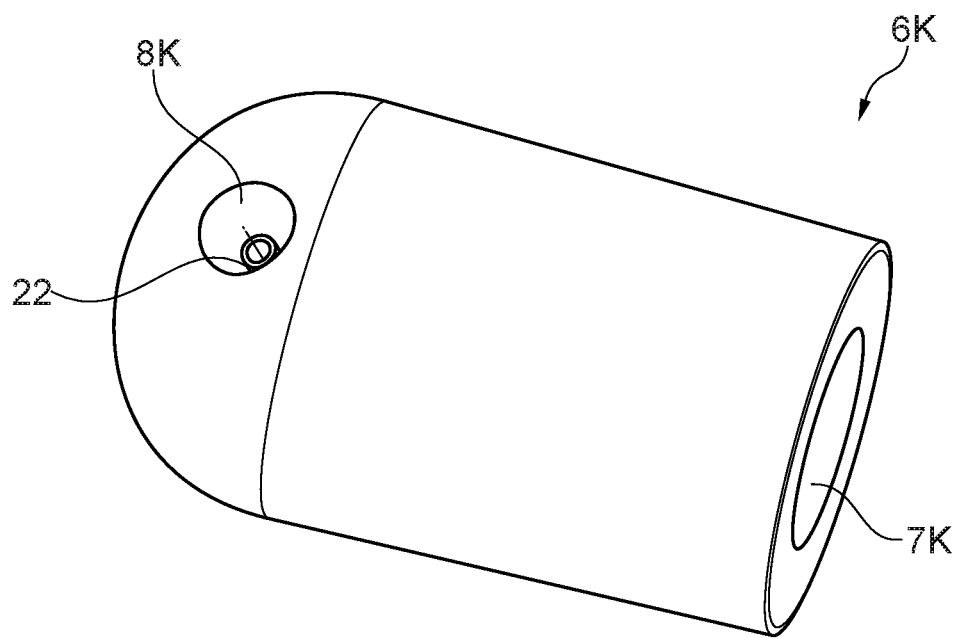
FIG. 27 illustrates an embodiment of a guiding structure for a dome.

FIG. 27 illustrates an embodiment of a guiding structure 6K for a dome of a personal audio device (not shown). The guiding structure 6K forms an interface 7K for receiving a part of the personal audio device (not shown) in an axial/longitudinal direction so that the personal audio device can output sound in the guiding structure 6K.

The guiding structure 6K is in the illustrated embodiment formed as an elongated tubular structure, where the interface 7K for receiving a part of the personal audio device includes an opening at one end of the guiding structure.

The guiding structure 6K comprises a sound opening 8K configured for passage of sound received in the guiding structure 6K from the personal audio device in a direction transverse to the axial/longitudinal direction out of the guiding structure 6K.

The sound opening 8K is positioned in the bottom of an indentation to protect the sound opening 8K by increasing the length of the transport way for cerumen and by increasing the deviation.

To further protect the sound opening 8K, the bottom of the indentation comprises an additional flexible member formed as a neck-portion 22 arranged around and partly covering the sound opening 8K. The neck-portion 22 is configured to protect the opening 8K, whereby the risk of debris, wax, etc. being pressed into the guiding structure via the opening can be reduced.

Figure 28:
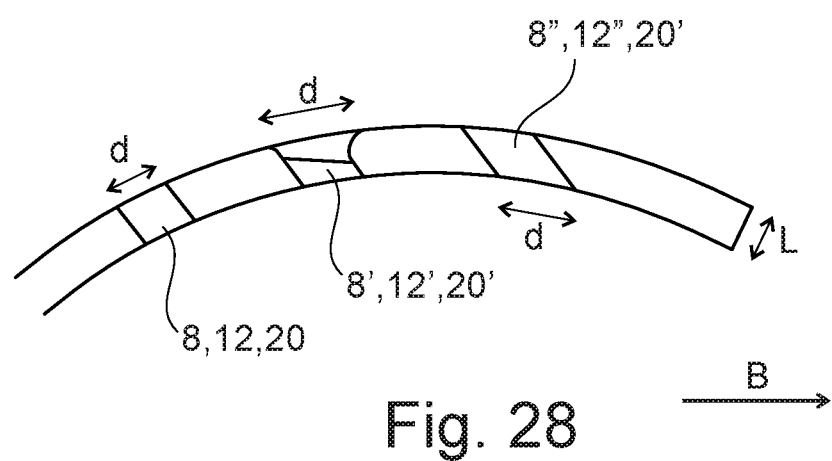
FIG. 28 illustrates details of a sound opening.
Figure 29A:
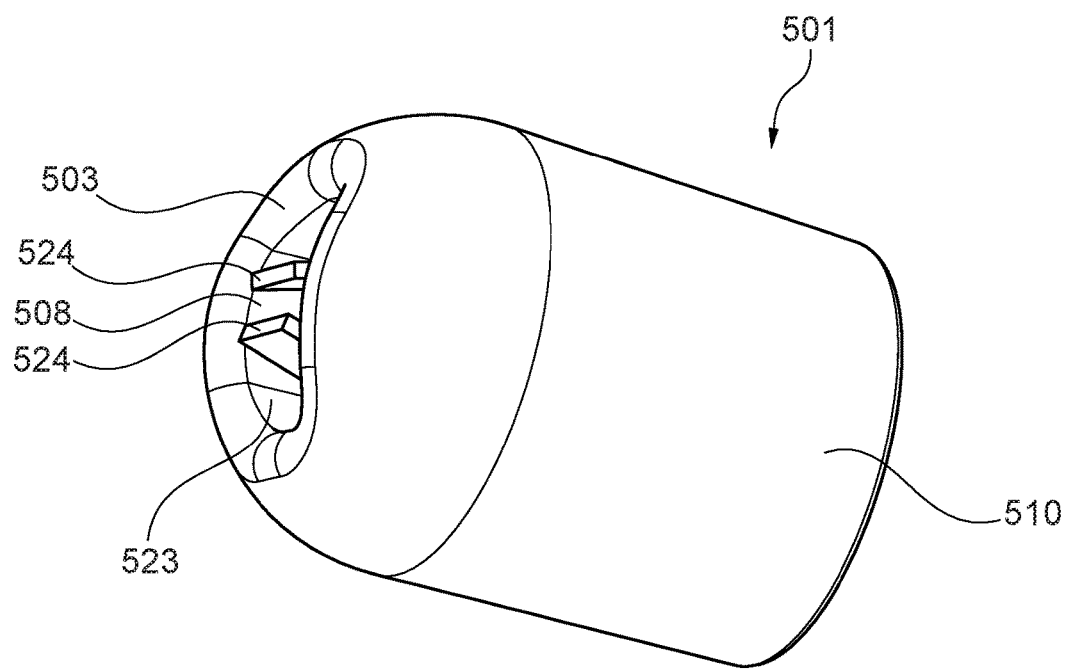
FIG. 29a illustrates an embodiment of a dome in a first view.
Figure 29B:
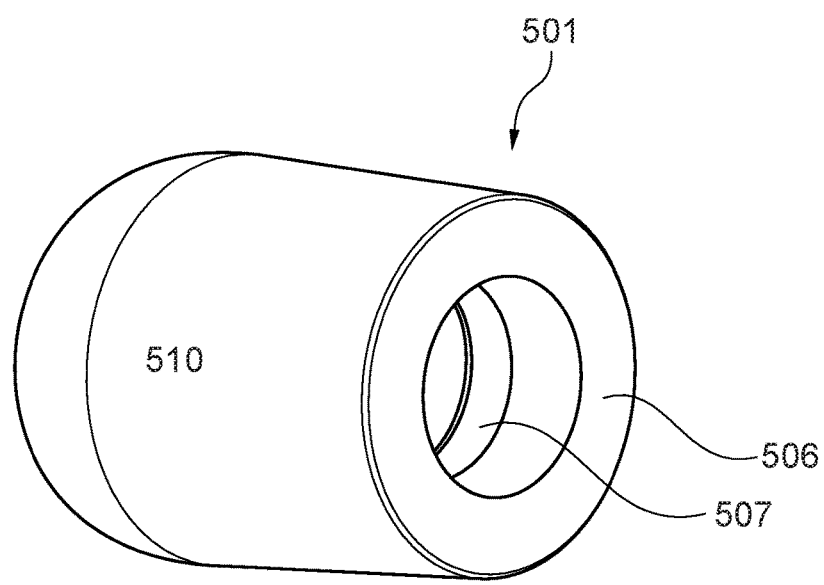
FIG. 29b illustrates the dome shown in FIG. 29a in a second view.
Figure 30A:
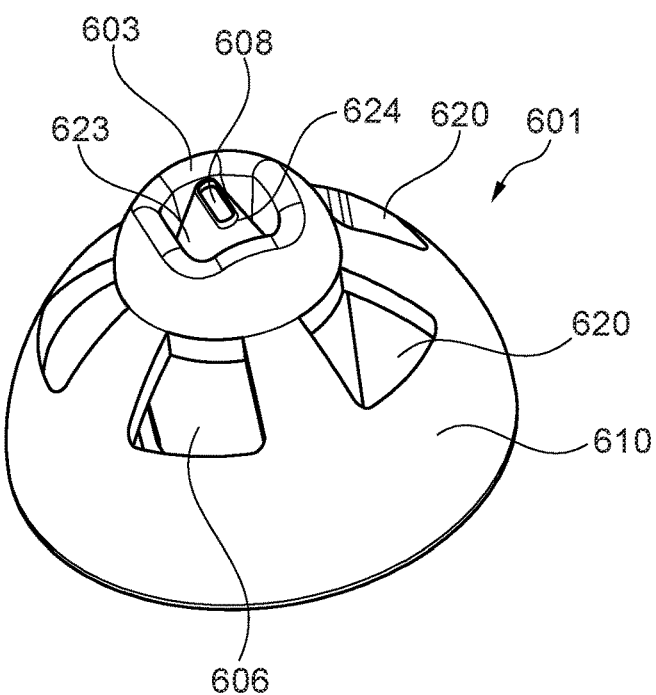
FIG. 30a illustrates an embodiment of a dome in a first view.
Figure 30B:
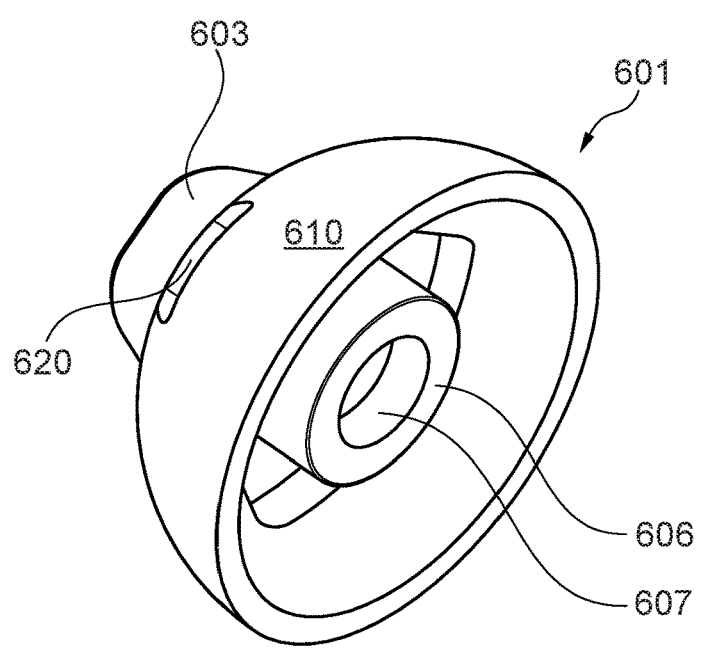
FIG. 30b illustrates the dome shown in FIG. 30a in a second view.

FIG. 28 illustrates details of different openings for a dome according to the inventions, such as sound openings 8 of a guiding structure, and openings 12, 20 of a first and a second flexible member. FIG. 28 is a cross-section through such openings 8, 12, 20.

The opening 8, 12, 20 is a traditional opening where the circumferential edge along the opening is formed at an angle being substantially perpendicular to the surface.

To decrease the risk of accumulation of debris, wax, etc., at the edge of the opening 8', 12', 20', a circumferential edge along the opening 8', 12', 20' is formed at an angle in the range of 10 degrees relative to an outer surface. Furthermore, the opening 8', 12', 20' has s fillet (rounded edge) to reduce accumulation of cerumen.

The opening 8", 12", 20" is formed at shallow angle that reduces accumulation of cerumen when the opening/sound outlet is scraped relative to the ear canal from left to right as illustrated by the arrow B.

Sound openings may have an even further improved resistance to clogging by keeping the length L of the openings (i.e. the material thickness of the element in which they are arranged) relatively short compared to the diameter d of the openings. Thus, the length L may be less than 0.6 mm.

FIGS. 29a, 29b and 30a, 30b illustrate alternative embodiments of dome 501, 601 personal audio device (not shown). The dome 501, 601 forms a first flexible circumferential member 503, 603 configured to at least partly close the opening 508, 608 and a second circumferential member 510, 610 configured for supporting the dome 501, 601 against an inner wall of an ear canal of a user.

The dome 501, 601 further comprises a guiding structure 506, 606 forming an interface 507, 607 for receiving a part of the personal audio device in an axial direction so that the personal audio device can output sound in the guiding structure 506, 606.

The guiding structure 506, 606 comprises a sound opening 508, 608 configured for passage of sound received in the guiding structure 6B from the personal audio device parallel to the axial/longitudinal direction out of the guiding structure 506, 606.

The first flexible circumferential member 503, 603 form a space 523, 623 in the form of an indentation in axial direction.

The guiding structure 501, 601 comprises a sound opening 508, 608 configured for passage of sound from the personal audio device to the space 523, 623.

To protect the sound opening 508, 608, the dome 501, 601 comprises a flexible flap 524, 624 configured to at least partly close the sound opening 508, 608 during insertion of the dome 501, 601 into the ear canal.

The flexible flap 524 comprises a pair of flaps configured to bend against each other and thus at least partly close the opening 508 as also done by the flexible flap 14, the bridge-like structure 15, and the neck-portion 22 described above.

The flexible flap 624 is formed as a mouth-shaped flap configured to at least party close the opening 508.

Figure 31:
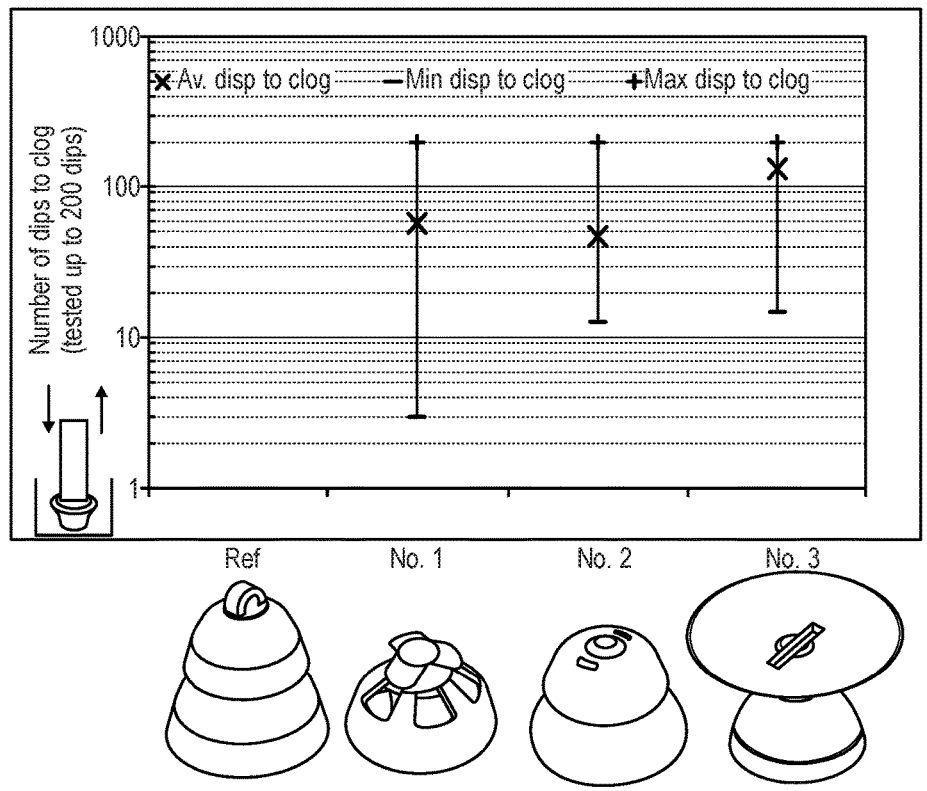
FIG. 31 illustrates results of a dip test.

FIG. 31 illustrates the result of a wax protection performance test of domes according to the present invention. The performance tests are carried out as a "dip test" where domes are dipped into an artificial cerumen several times. One of the parameters analysed is the number of dips before the sound opening is clogged. The dip test reveals that the sound opening of a traditional dome gets clogged after 1-2 dips, whereas the sound opening of domes according to the present invention remains unclogged after 10 times more dips into the artificial cerumen. The graph comprises the test result of a traditional dome; i.e. a ref dome compared to three different embodiments, No. 1, No. 2, and No. 3 as illustrated along the X axis.

For each embodiment, the average number of dips before clogging is indicated by a cross, and the minimum number and maximum number of dips before clogging is indicated below and above the cross, respectively.

Figure 32:
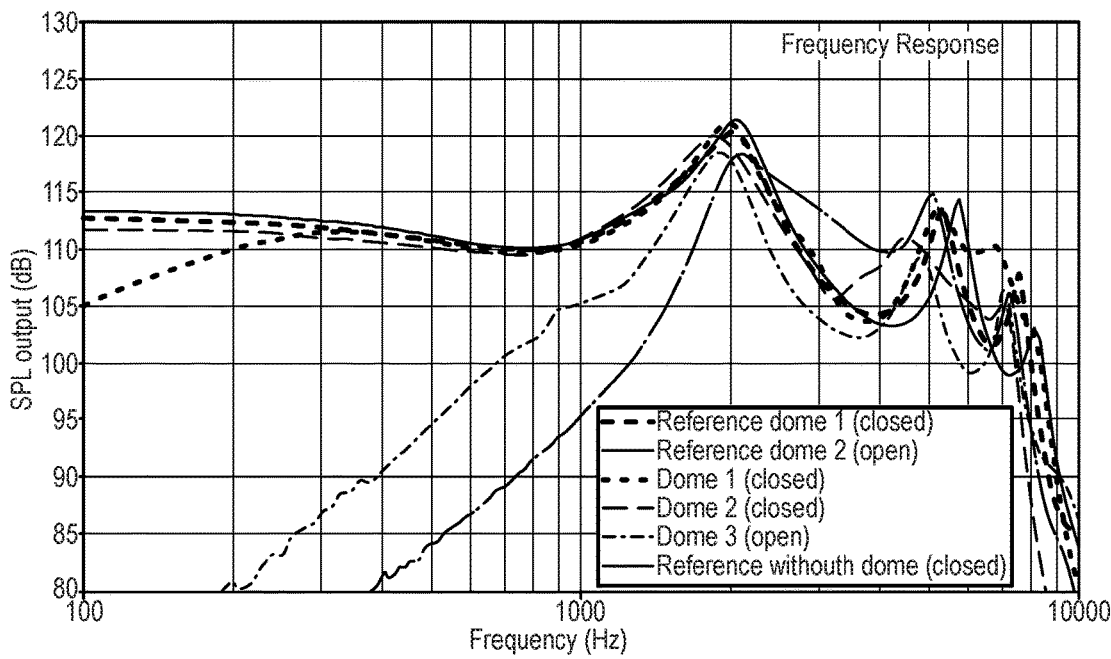
FIG. 32 illustrates a comparison of acoustic response for different embodiments of a dome.

FIG. 32 illustrates a comparison of acoustic response for different embodiments of a dome.

As illustrated in the graph, the reference dome 1 behaves as a closed dome, with similar characteristics to those of the reference sample without a dome.

An additional resonance/peak is apparent in the two embodiments Dome 1 and Dome 2, but the frequency is not the same: ~4.5 kHz for the Dome 2 and ~7 kHz for the Dome 1.

The Dome 3 behaves in the coupler as an open dome. However, a peak which does not appear in the reference Dome 2 (open) is visible around 9 kHz.

EMBODIMENTS

The invention may e.g. be covered by the following embodiments:

Embodiment 1

A dome for a personal audio device, the dome forming a first flexible circumferential member configured for supporting the dome against an inner wall of an ear canal of a user, the dome further comprises a guiding structure extending in a longitudinal direction and forming an interface for guiding sound from the personal audio device, wherein the guiding structure comprises a least one sound outlet configured for passage of sound from the personal audio device in a direction transverse to the longitudinal direction out of the guiding structure.

Embodiment 2

A dome according to embodiment 1, wherein the sound outlet forms an opening being transverse to the longitudinal direction.

Embodiment 3

A dome according to embodiment 2, wherein a circumferential edge along the opening is formed at an angle in the range of 15-75 degrees relative to an outer surface of the guiding structure.

Embodiment 4

A dome according to any of the preceding embodiments, wherein the interface is configured for receiving at least a part of the personal audio device.

Embodiment 5

A dome according to any of the preceding embodiments, wherein the sound outlet is at least partly covered by a flexible flap configured to at least partly close the sound outlet during insertion and/or removal of the dome from the ear canal.

Embodiment 6

A dome according to embodiment 5, wherein the flexible flap is configured to move between a first configuration, where the sound outlet is open, and a second configuration, where the sound outlet is at least partly closed.

Embodiment 7

A dome according to embodiment 5 or 6, wherein the flexible flap forms part of the first flexible member.

Embodiment 8

A dome according to any of the preceding embodiments, wherein a porous element at least partly fills the sound outlet.

Embodiment 9

A dome according to any of the preceding embodiments, wherein the guiding structure forms an inner space confined by the guiding structure and the part of the personal audio device.

Embodiment 10

A dome according to any of the preceding embodiments, wherein the dome further forms a second flexible circumferential member arranged at a distance from the first member to form a second space between the first and second members, and wherein the second space is arranged in communication with the guiding structure via the sound outlet.

Embodiment 11

A dome according to any of the preceding embodiments, wherein at least one of the first and second flexible members comprise at least one opening configured for sound passage.

Embodiment 12

A dome according to embodiment 10 or 11, wherein the second space is confined by an inner wall of the ear canal and the first member and the second member.

Embodiment 13

A dome according to embodiment 10 or 11, wherein the second space is confined by the first member and second member which are joined along an outer edge.

Embodiment 14

A dome according to any of embodiments 11-13, wherein the at least one opening is arranged at a distance from a centre point of the flexible member.

Embodiment 15

A dome according to any of embodiment s11-14, wherein two openings are arranged symmetrically relative to a centre point of the flexible member.

Embodiment 16

A dome according to any of the preceding embodiments, wherein a flexibility of at least one of the first member and the second member may be larger towards the edge of the flexible member that at the centre of the flexible member.

Embodiment 17

A dome according to any of the preceding embodiments, wherein a thickness of at least one of the first member and the second member is larger towards the centre of the member than at the edge of the member.

Embodiment 18

A dome according to any of the preceding embodiments, wherein at least one of the first member and the second member is detachable attached to the dome to form a detachable member.

Embodiment 19

A dome according to embodiment 18, wherein the detachable member is attached by frictional forces.

Embodiment 20

A dome according to embodiment 18 or 19, wherein the detachable member is attached by a geometrical locking structure.

Embodiment 21

A dome according to any of the preceding embodiments, wherein at least one stiffening element is arranged at one side of at least one of the first and second flexible member.

Embodiment 22

A dome according to any of embodiments 10-21, wherein the volume of the second space is at least 10 mm3.

Embodiment 23

A method of protecting a sound output of a personal audio device, the method comprising the step of:
  providing a dome according to any of embodiments 1-22,
  attaching the dome to the personal audio device so that the personal audio device can output sound in the guiding structure.

Embodiment 24

A method of modifying an acoustic response of a personal audio device, the method comprising the step of:
  providing a dome according to any of embodiments 10-22,
  attaching the dome to the personal audio device so that the personal audio device can output sound in the guiding structure, the first and second flexible second members forming a second space having a volume of at least 10 mm3.

It should be understood, that the sound outlet referred to in the above embodiments, may also be sound inlet, and thus be denoted sound openings.

The invention claimed is:

1. A dome for a personal audio device, the dome forming a first flexible circumferential member and comprising a guiding structure extending in a longitudinal direction and forming an interface for guiding sound from or to the personal audio device, wherein the guiding structure comprises a least one sound opening configured for passage of sound from or to the personal audio device in a direction transverse to the longitudinal direction of the guiding structure, and wherein the first flexible circumferential member is configured to at least partly close the sound opening during insertion of the dome into an ear canal of a user.

2. A dome according to claim 1, wherein the first flexible circumferential member forms a tip end terminating the dome in the longitudinal direction.

3. A dome according to claim 1, further comprising a second flexible circumferential member, wherein at least one of the first and second flexible circumferential member is configured for supporting the dome against an inner wall of an ear canal of a user.

4. A dome according to claim 1, further comprising a deviation member arranged adjacent to the first flexible circumferential member in the longitudinal direction, the deviation member being configured to at least partly close the sound opening.

5. A dome according to claim 4, wherein the deviation member comprises a substantially circular rim portion extending around the guiding structure.

6. A dome according to claim 1, wherein a porous element at least partly fills the sound opening.

7. A dome according to claim 6, wherein the porous element is arranged at least partly in the guiding structure.

8. A dome according to claim 1, wherein the second flexible circumferential member is arranged at a distance from the first flexible circumferential member in the longitudinal direction to form a second space between the first and second members, and wherein the second space is arranged in communication with the guiding structure via the sound opening.

9. A dome according to claim 1, wherein at least one of the first and second flexible circumferential members comprise at least one opening configured for sound passage.

10. A dome according to claim 1, wherein a flexibility of at least one of the first flexible circumferential member and the flexible circumferential second member may be larger towards the edge of the flexible circumferential member that at the centre of the flexible circumferential member.

11. A dome according to claim 1, wherein a thickness of at least one of the first flexible circumferential member and the second flexible circumferential member is larger towards the centre of the flexible circumferential member than at the edge of the member.

12. A dome according to claim 1, wherein at least one of the first flexible circumferential member and the second flexible circumferential member is detachable attached to the dome to form a detachable member.

13. A dome according to claim 1, further comprising at least one stiffening element attached at one side of at least one of the first and second flexible circumferential members.

14. A method of modifying an acoustic response of a personal audio device, the method comprising the step of:
 providing a dome according to claim 1,
 attaching the dome to the personal audio device so that the personal audio device can output sound in the guiding structure, the first and second flexible second members forming a second space having a volume of at least 10 mm3.

15. A personal audio device comprising a dome according to claim 1 and at least one receiver for generation of sound.

* * * * *